& Kraus

United States Patent [19]
Koharagi et al.

[11] Patent Number: 4,983,895
[45] Date of Patent: Jan. 8, 1991

[54] METHOD AND APPARATUS FOR OPERATING VACUUM CLEANER

[75] Inventors: Haruo Koharagi, Ibaraki; Kazuo Tahara, Hitachi; Tsunehiro Endo, Hitachiota; Kunio Miyashita, Hitachi; Yoshitaro Ishii, Hitachi; Fumio Jyoraku, Hitachi; Syuji Watanabe, Ibaraki; Hisanori Toyoshima, Hitachi; Kohichi Saito, Kitaibaraki; Wakichiro Hishi, Nagareyama; Koujirou Yamashita, Hitachi, all of Japan

[73] Assignee: Hitachi, Ltd., Tokyo, Japan

[21] Appl. No.: 365,491

[22] Filed: Jun. 13, 1989

Related U.S. Application Data

[62] Division of Ser. No. 105,598, Oct. 8, 1987, Pat. No. 4,880,747.

[51] Int. Cl.$^5$ .............................................. H02P 6/02
[52] U.S. Cl. .................................... 318/254; 318/138
[58] Field of Search .............................. 318/254, 136

[56] References Cited

U.S. PATENT DOCUMENTS

| | | | |
|---|---|---|---|
| 4,415,844 | 11/1983 | Mendenhall et al. | 318/254 |
| 4,675,583 | 6/1987 | Berghammer | 318/254 |
| 4,748,386 | 5/1988 | Nakanishi et al. | 318/254 |
| 4,749,923 | 6/1988 | Cheing | 318/254 |
| 4,751,438 | 6/1988 | Markunas | 318/254 |
| 4,797,600 | 1/1989 | Savage et al. | 318/558 |

Primary Examiner—Bernard Roskoski
Attorney, Agent, or Firm—Antonelli, Terry, Stout &

[57] ABSTRACT

Method and apparatus for operating a vacuum cleaner in which by detecting a rotational speed of a variable speed fan motor adapted to give a suction force to the cleaner and its change range, the choking state of the filter and the state of the cleaner surface are discriminated, and a speed command of the fan motor is corrected on the basis of the result of the discrimination, and the comfortable cleaning can be performed by the optimum suction force.

2 Claims, 28 Drawing Sheets

METHOD AND APPARATUS FOR OPERATING VACUUM CLEANER

This is a division of application Ser. No. 07/105,598, filed Oct. 8, 1987 now U.S. Pat. No. 4,880,474.

BACKGROUND OF THE INVENTION

The present invention relates to a vacuum cleaner and, more particularly, to a method and an apparatus for operating a vacuum cleaner which is operated in the optimum condition in accordance with the state of the cleaning surface and the choking state of the cleaner.

In general vacuum cleaners, an input is set to a constant value irrespective of the state of the cleaning surface. Therefore, the suction force is too strong or too weak for the cleaning surface or an object to be cleaned, so that the optimum control which is comfortable to the user cannot be performed.

To solve this problem, such an optimum control can be realized by, for example, controlling the input and adjusting a suction amount of the cleaner in accordance with the cleaning surface. As a method of adjusting the suction amount of the cleaner, a method whereby the rotational speed of the drive motor is variably set is first considered. As a method of changing the rotational speed of the motor, there have been known a method whereby the phase is controlled using a thyristor and a method whereby the rotational speed is controlled by an inverter.

A vacuum cleaner disclosed in JP-A-60-242827 relates to the latter method. Namely, this cleaner uses a brushless motor which is driven by an inverter.

Although the motor which is driven by the inverter is disclosed in the foregoing official gazette, nothing is taught with respect to the technical subject for allowing the motor to be automatically operated in the optimum condition in accordance with the state of the cleaning surface or the choking state of the filter. In addition, means for solving this technical subject is not shown.

SUMMARY OF THE INVENTION

It is the first object of the present invention to provide a method and an apparatus for operating a vacuum cleaner in which a suction amount is controlled in the optimum condition in accordance with the state of the cleaning surface and the choking state of the filter.

The second object of the invention is to provide an apparatus for operating a vacuum cleaner in which a rotational speed of a brushless DC motor is controlled in the optimum condition in accordance with the load state of the vacuum clearer.

The third object of the invention is to provide an apparatus for operating a vacuum cleaner in which one kind of speed control unit and a motor can be used for two kinds of voltage systems.

It is the first feature of the present invention that in a vacuum cleaner having a filter to collect dusts and a variable speed fan motor adapted to give a suction force to the cleaner, the rotational speed of the fan motor is sequentially detected at short periods during the cleaning, the state of the cleaning surface or an object to be cleaned is presumed from the fluctuation mode based on a change in rotational speed which was detected within a predetermined sampling time, and then the input of the fan motor is automatically adjusted to set the rotational speed of the motor into the speed which is suitable for the presumed state of the cleaning surface or the like.

It is the second feature of the invention that in a vacuum cleaner which comprises a brushless DC motor used as a drive source and a speed control unit consisting of an inverter control unit to drive this motor, a control circuit of the inverter control unit comprises a microcomputer, a current detecting circuit, a magnetic pole position detecting circuit, and a speed command circuit, and the load state of the cleaner is calculated by the microcomputer from a load current and a rotational speed of the brushless DC motor, and a voltage or a current which is applied to the brushless DC motor is controlled on the basis of the result of the load state so that the brushless DC motor has the series wound characteristic.

It is the third feature of the invention that in a speed control unit of a motor comprising a step-up chopper circuit to step up a voltage which is obtained by rectifying an AC power source voltage, an electric power converter to control a current supplying angle (i.e. conducting period of angle) of an output voltage of the step-up chopper circuit and to apply to a motor, and a control circuit to control the step-up chopper circuit and the electric power converter, the control circuit has: a power source voltage detecting circuit to detect a magnitude of an AC power source voltage; and a speed control circuit for controlling the speed of the motor by changing an output voltage of the step-up chopper circuit in the state in which the current supplying angle of the electric power converter is held to a predetermined value in the case where the AC power source voltage is of the low voltage system, and for controlling the speed of the motor by changing the current supplying angle of the electric power converter in the state in which the output voltage of the step-up chopper circuit is held to a predetermined value in the case where the AC power source voltage is of the high voltage system.

BRIEF DESCRIPTION OF THE DRAWINGS

FIG. 16 is a schematic constitutional block diagram showing a control circuit of a speed control unit;

FIG. 17 is a whole constitutional diagram of a speed control unit consisting of a brushless DC motor and an inverter control unit;

FIG. 18 is a diagram showing performance curves of a vacuum cleaner;

FIG. 19 is a schematic constitutional block diagram showing a control circuit of a speed control unit;

FIG. 20 is a diagram showing performance curves of a vacuum cleaner;

FIG. 21 is a schematic constitutional block diagram showing a control circuit of a speed control unit;

FIG. 22 is a diagram showing a whole constitution of the speed control unit consisting of a brushless DC motor and an inverter control unit;

FIG. 23 is a diagram showing performance curves of a vacuum cleaner;

FIG. 24 is a diagram showing performance curves of a vacuum cleaner,

FIG. 25 is a diagram showing performance curves of a vacuum cleaner having the power saving function, FIG. 26 is a schematic constitutional block diagram showing a control circuit, FIG. 27 is an explanatory diagram showing the processing operation of a microcomputer, FIGS. 28 to 30 are diagrams showing another embodiment (7) of the invention;

FIG. 28 is a diagram showing performance curves of a vacuum cleaner,

FIG. 30 is a schematic constitutional block diagram showing a control circuit to drive a brushless DC motor of the invention, FIGS. 31 to 37 are diagrams showing another embodiment (8) of the invention;

FIG. 31 is a block diagram showing a circuit constitution,

FIG. 32 is a diagram showing waveforms of an AC power source voltage and a power source current, FIG. 33 is a characteristic diagram of an initial charging voltage of a capacitor, FIG. 34 is a flowchart for a switching process of a speed control of a microcomputer, FIG. 35 is a characteristic diagram of a DC voltage to a speed command value.

DESCRIPTION OF THE PREFERRED EMBODIMENTS

An embodiment of the present invention will be described in detail hereinbelow with reference to FIGS. 1 to 11. The invention is constituted on the assumption that a variable speed motor is used as a drive source of a vacuum cleaner (fan motor). As a variable speed motor, it is considered to use an AC commutator motor whose speed is changed by controlling the input, a phase controlled motor, an induction motor which is driven by an inverter, a reactance motor, a brushless motor which is driven by an inverter, or the like. This embodiment will be explained with respect to an example in which a brushless DC motor having no mechanical brush in which the life is long and the control response speed is high is used.

Figure 1:
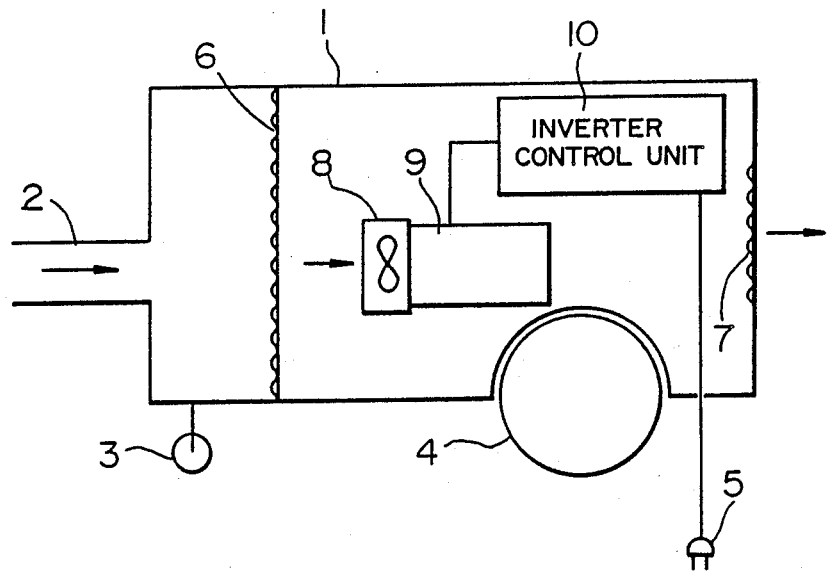
FIG. 1 is a schematic constitutional diagram of a vacuum cleaner according to an embodiment of the present invention.

FIG. 1 is a schematic constitutional diagram of a vacuum cleaner according to an embodiment of the invention. In the diagram, reference numeral 1 denotes a vacuum cleaner main body; 2 is a hose; 3 and 4 wheels; 5 a power supply cord; 6 and 7 filters; 8 a fan; 9 a brushless; DC motor; and 10 an inverter control unit. When an electric blower consisting of the fan 8 and brushless DC motor 9 is driven by the inverter control unit 10, the wind inhaled by the hose 2 passes along the path consisting of the filter 6, fan 8, and filter 7 as indicated by arrows and is discharged from the vacuum cleaner main body 1. Thus, the fine particles of the abraded powder of the brush are not discharged from the vacuum cleaner and at the same time, the smell due to the sparks of the brush is not generated. Therefore, there is an effect such that the user can perform the cleaning operation in clean circumstances.

Figure 2:
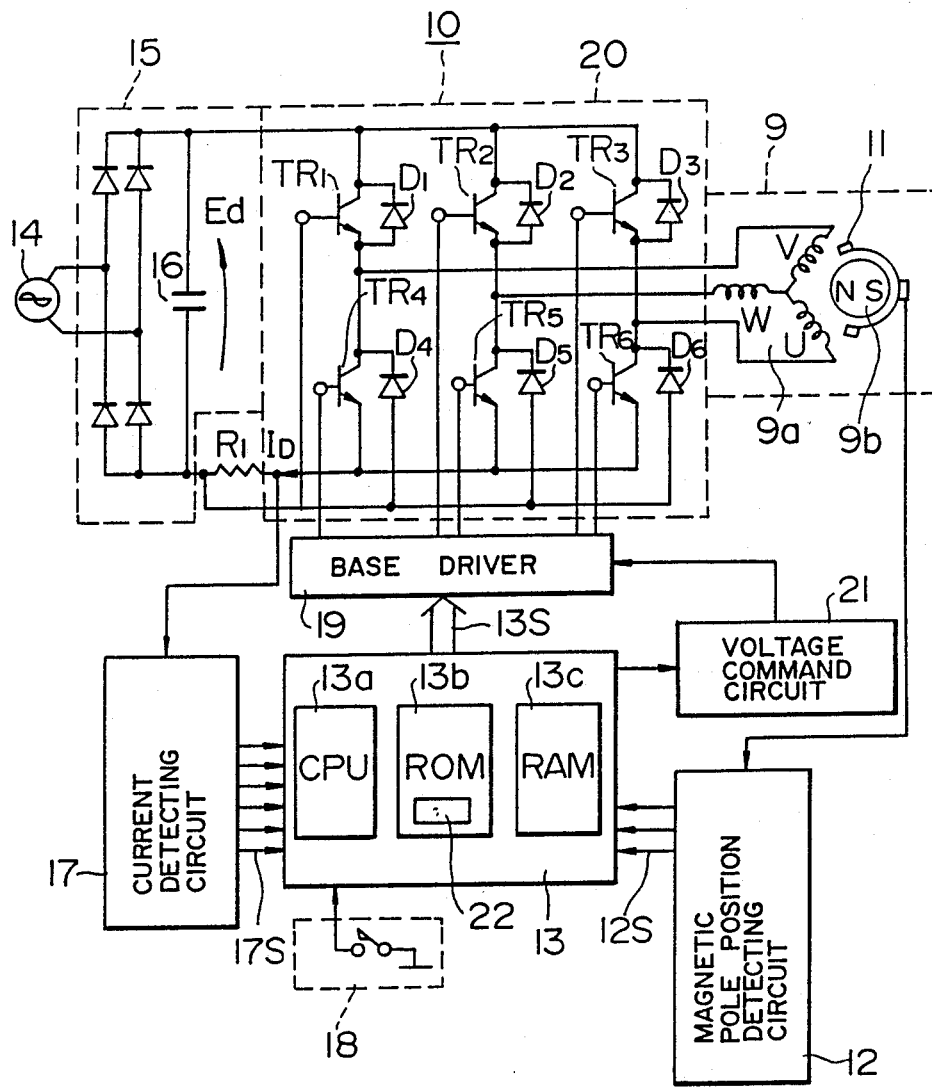
FIG. 2 is a whole constitutional diagram of a speed control unit comprising a brushless DC motor and an inverter control unit.

FIG. 2 shows a whole constitution of a speed control unit consisting of the brushless DC motor and inverter control unit of the invention.

In the diagram, reference numeral 10 denotes the inverter control unit. An AC power source 14 is rectified by a rectifier 15 and smoothed by a capacitor 16, so that a DC voltage $E_d$ is supplied to an inverter 20. The inverter 20 is the inverter having a conducting period of angle 120° comprising transistors $TR_1$ to $TR_6$ and flywheel diodes $D_1$ to $D_6$ connected thereto. The transistors $TR_1$ to $TR_3$ constitute a positive arm. The transistors $TR_4$ to $TR_6$ constitute a negative arm. The current supplying period of time (i.e. conducting period of angle) of each arm corresponds to the electric angle of 120° and is pulse width modulated (PWM). A resister $R_1$ of a relatively low resistance is commonly connected between the emitter of each of the transistors $TR_4$ to $TR_6$ constituting the negative arm and the anode terminal of each of the flywheel diodes $D_4$ to $D_6$.

The brushless DC motor 9 comprises a rotor 9b using permanent magnets of two poles as fields and a stator 9a into which armature windings U, V, and W are inserted. Since winding currents flowing through the armature windings U, V, and W also flow through the low resistor $R_1$, a load current $I_D$ of the motor 9 can be detected by the voltage drop of the low resistor $R_1$. The speed control circuit of the brushless DC motor 9 mainly comprises: a magnetic pole position detecting circuit 12 to detect the position of the magnetic pole of the rotor R by a Hall device 11 or the like; a current detecting circuit 17 of the load current $I_D$; a base driver 19 to drive the transistors $TR_1$ to $TR_6$; and a microcomputer 13 to drive the base driver 19 on the basis of detection signals obtained from the detecting circuits 12 and 17. Numeral 18 denotes an operation switch which is operated by the actual user.

The magnetic pole position detecting circuit 12 receives a signal from the Hall device 11 and produces a position detection signal 12S of the rotor 9b. The position detection signal 12S is used to switch the currents of the armature windings U, V, and W and is also used as the signal to detect the rotational speed. The microcomputer 13 obtains the speed by counting the number of position detection signals 12S within a predetermined sampling time.

The current detecting circuit 17 detects the voltage drop of the resistor $R_1$ to obtain the load current $I_D$, and a current detection signal 17S is obtained by an A/D converter (not shown).

The microcomputer 13 comprises: a central processing unit (CPU) 13a; a read only memory (ROM) 13b; and a random access memory (RAM) 13c. Although not shown, these components are mutually connected by an address bus, a data bus, a control bus, etc. The programs necessary to drive the motor 9, for example, the programs for the process to calculate the speed, the process to fetch a speed command, the process to control the speed, etc. are stored in the ROM 13b. On the other hand, a function table 22 in which various kinds of arbitrary speed control patterns are stored is provided in the ROM 13b.

The RAM 13c comprises: a memory section to read and write various kinds of data necessary to execute the foregoing various kinds of processing programs; and a memory section in which a speed pattern data relative to the value of the winding current to be supplied every position of the rotor is stored.

The transistors $TR_1$ to $TR_6$ are respectively driven by the base driver 19 in response to an ignition signal 13S which was processed and produced by the microcomputer 13. A voltage command circuit 21 produces a chopper signal, which will be explained hereinafter.

Since the winding currents flowing through the armature windings U, V, and W of the motor 9 correspond to the output torque of the motor 9, the output torque can be varied by changing the winding currents. Namely, by adjusting the load current $I_D$, the output torque can be continuously arbitrarily changed. In addition, by changing the driving frequency of the inverter 20, the rotational speed can be freely changed.

Figure 3:
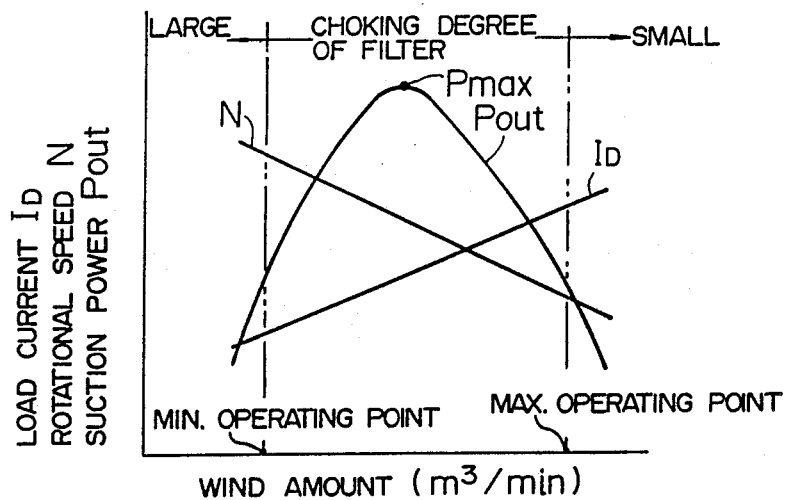
FIG. 3 is a diagram showing performance curves of the vacuum cleaner.

The characteristic of the vacuum cleaner is as shown in FIG. 3. In FIG. 3, an axis of abscissa denotes the wind amount Q (m$^3$/min) of the vacuum cleaner and an axis of ordinate indicates the suction power $P_{out}$ representative of the suction performance, the rotational speed N of the motor, and the load current $I_D$. The region surrounded by two alternate long-and two short dashes lines-indicates the actual operating range.

When the filter is hardly choked, the wind amount Q is maximum and the rotational speed N is minimum. As the degree of choking state progresses, the operating point gradually moves to the left and when the filter is completely choked, the wind amount Q is minimum and the rotational speed N is maximum and the operating point reaches the minimum point. The suction power $P_{out}$ decreases irrespective of the choking amount of the filter in the ranges before and after the maximum suction power $P_{max}$ as a turning point. Therefore, by controlling the rotational speed of the motor to the optimum speed in accordance with the choking amount of the filter, it is possible to provide the vacuum cleaner which can improve the suction power $P_{out}$.

A method of detecting the state or kind of cleaning surface will now be described. In this embodiment, an attention is paid to the fact that the minimum or maximum rotational speed, the average rotational speed, or the fluctuating state of the rotational speed varies in dependence on the cleaning surface. The cleaning surface is presumed from the rotational speed, thereby controlling the motor to perform the optimum operation according to the presumed state of the cleaning surface.

Figure 4A:
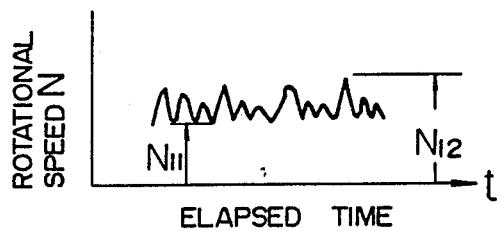
FIGS. 4A and 4B are diagrams showing fluctuations in rotational speed due to the choking state of a filter.
Figure 4B:
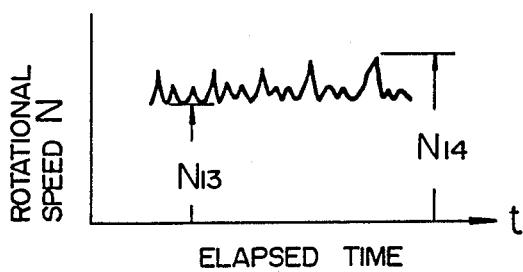

FIGS. 4A and 4B show fluctuations in rotational speed-of the motor in the case of cleaning a tatami mat. (Japanese straw matting). These diagrams show the fluctuations in rotational speed which were actually confirmed by the experiments. FIG. 4A shows the case where the wind amount Q is large in the state in which the filter is not choked. FIG. 4B shows the case where the wind amount Q is small in the state in which the filter was choked. As will be obvious from these diagrams, when the cleaning was performed by the cleaner whose wind amount is large, the rotational speed of the motor changes from the minimum speed $N_{11}$ to the maximum speed $N_2$. On the other hand, when the cleaning was performed by the cleaner in the choking state, the rotational speed of the motor changes from the minimum speed $N_{13}$ to the maximum speed $N_{14}$. As will be clearly understood from the comparison between them, in the case of the cleaner in the choking state, the minimum speed $N_{13}$ is higher than the minimum speed $N_{11}$ when the filter is not choked. Likewise, the maximum speed $N_{14}$ is also higher than the maximum speed $N_{12}$. Therefore, for example, if the minimum speed $N_{11}$ is stored in the ROM 13b or RAM 13c and compared with the minimum speed $N_{13}$ when the cleaner was actually operated, the choking state of the filter can be detected. A reference value of the rotational speed which is stored in the ROM 13b or RAM 13c is not limited to only the value of $N_{11}$ but may be set to $N_{12}$, $N_{13}$, or $N_{14}$. If the degree of the choking state is high, the difference between the rotational speeds is large. Therefore, by increasing the input so as to raise the rotational speed in accordance with this difference, a desired suction force of the cleaner can be obtained and the suction power $P_{out}$ can be also improved As explained above, although the rotational speed of the motor of the cleaner varies in dependence on the choking state of the filter, it is actually largely influenced by the state of the cleaning surface. Since the cleaning surface is instantaneously changed during a single cleaning operation in a manner such that it is changed from the floor to a carpet or from a tatami mat to a curtain, a fluctuation in rotational speed occurs due to the change in cleaning surface, i.e., during a single cleaning operation when considering the time cycle. However, by properly deciding the sampling time, the change in cleaning surface can be also detected.

Figure 5:
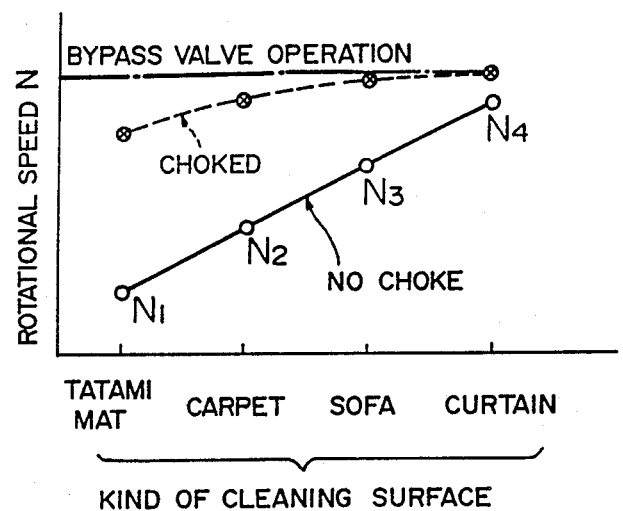
FIG. 5 is a diagram showing a fluctuation in rotational speed in the case where the cleaning surface and the choking state of the filter are considered.

This state is shown in FIG. 5. In FIG. 5, an axis of abscissa denotes the surface or object to be cleaned and an axis of ordinate indicates the rotational speed. Although there are various kinds of cleaning surfaces and objects to be cleaned, typical four kinds of cleaning surfaces and objects such as tatami mat, carpet, sofa, and curtain are shown in this diagram. In the diagram, a solid line shows the rotating state in the case where the filter is not choked and a broken line indicates the rotating state in the case where the filter is choked. Namely, the rotational speed is the lowest in the case of tatami mat and sequentially increases in accordance with the order of carpet, sofa, and curtain. This tendency is derived irrespective of the choking state of the filter. However, as the choking state progresses, there is a tendency such that the difference between the rotational speeds decreases even when the kind of cleaning surface changes. Although the rotational speeds $N_1$ to $N_4$ for the respective cleaning surfaces vary even when they are cleaned, respectively, each of those speeds represents the minimum rotational speed or average rotational speed. When the vacuum cleaner is operated for a long time in a closed room, the air is not circulated in the room and the heat cannot be radiated, so that the temperature increases and there is a fear of burning of the motor. To avoid this, a bypass passage is provided for the main air passage. In general, the bypass passage takes the outside air from the portions other than the suction port and feeds the cooling wind to the electric blower. The inside of the cleaner is cooled by this cooling wind and thereafter, the cooling wind is discharged to the outside. The indication of the operation of a bypass valve in FIG. 5 indicates the position at which the valve is made operative to open the bypass passage when the suction port was completely closed. The bypass valve functions as what is called a protecting apparatus to prevent that the rotational speed rises to a value which is equal to or higher than the speed indicated by the position of the bypass valve operation in FIG. 5.

As explained above, when the cleaning surface and object to be cleaned change and when the choking state fluctuates, the rotational speed varies. Therefore, in addition to accurately detecting the choking state, it is also necessary to detect the cleaning surface and object in order to perform the optimum operation of the cleaner in accordance with the cleaning surface and object.

Figure 6:
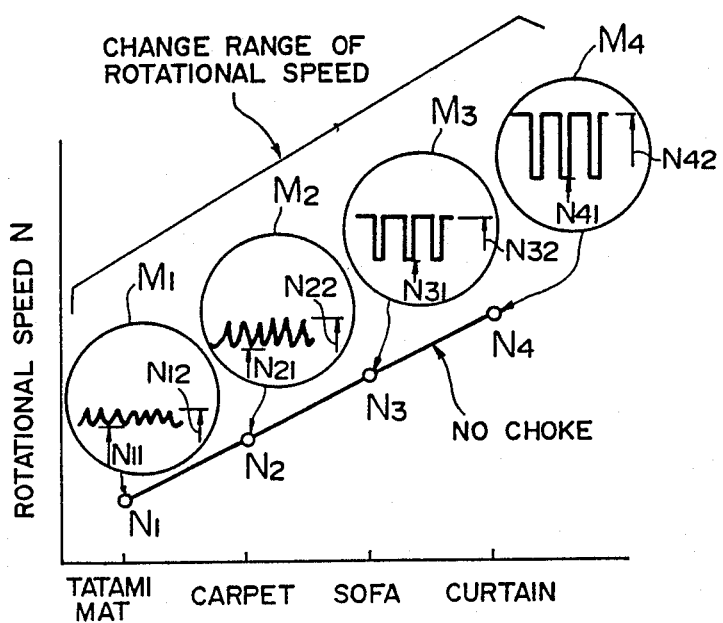
FIG. 6 is a diagram showing the differences of the fluctuation modes in rotational speed for the cleaning surfaces.

FIG. 6 shows the fluctuation modes of the rotational speed for every cleaning surface and every object in the case where the cleaning operation was executed by use of the cleaner having a filter which is not choked. Namely, similarly to FIG. 5, in FIG. 6, an axis of abscissa indicates the cleaning surface and an axis of ordinate represents the rotational speed. In particular, each of the fluctuation modes $M_1$ to $M_4$ shown in the circles indicates a change in rotational speed during the cleaning operation for each cleaning surface. An axis of abscissa denotes a time.

As is obvious from this diagram, when the cleaning surface is a tatami mat, the minimum speed is $N_{11}$ and the maximum speed is $N_{12}$ and a fluctuation in rotational speed is small within a predetermined sampling time. The minimum rotational speed at this time is $N_1$ shown in FIG. 5.

In the case of a carpet, the minimum speed is $N_{21}$ and the maximum speed is $N_{22}$ and the difference between the minimum and maximum speeds within the same sampling time as that mentioned above is larger than that in the case of the tatami mat. The minimum speed at this time is $N_2$.

The waveforms of vibration in the fluctuation modes of the rotational speeds in the cases of the tatami mat and carpet are similar although the fluctuation differences between the minimum and maximum speeds of the average rotational speeds are different.

In the case of a sofa, the minimum speed is $N_{31}$ and the maximum speed is $N_{32}$. The difference between them within the same sampling time is further larger than that in the case of the carpet. At this time, the minimum speed is $N_3$. The waveform in the fluctuation mode in the case of the sofa is similar to a square wave.

In the case of a curtain, the minimum speed is $N_{41}$ and the maximum speed is $N_{42}$ and the difference between them within the same sampling time is still larger than that in the case of the sofa. The minimum speed is $N_4$. The waveform in the fluctuation mode in the case of the curtain is also similar to a square wave similarly to the case of the sofa.

It can be considered that each of the minimum rotational speeds $N_{11}$, $N_{21}$, $N_{31}$, and $N_{41}$ corresponds to the open state in which the suction port was removed from the cleaning surface. However, the average rotational speed can be also used in place of the minimum rotational speed.

As is obvious from the above explanation, it will be understood that the surface or object which is actually being cleaned can be detected from the average or minimum rotational speed and the fluctuation modes $M_1$ to $M_4$ of the motor of the cleaner and that the choking state can be also detected.

On the other hand, when considering the cleaning surface or object to be cleaned, it is the carpet from which it is most difficult to fetch dusts. Therefore, when it has been decided that the cleaning surface is a carpet or an object similar to a carpet, it is desirable to set the rotational speed into the highest speed. Next, it is preferable to sequentially set the rotational speed in accordance with the tatami mat, sofa, and curtain so as to gradually decrease. Namely, it was desirable to assume the rotational speeds as mentioned above in consideration of the easiness in fetching of dusts and a phenomenon and state in which the suction port is attracted to the cleaning surface or the like.

Namely, since the cleaning surface or object or the choking state can be detected from FIG. 6 and the like, by setting the optimum rotational speed in accordance with the choking state detected, the cleaning operation can be performed in accordance with the cleaning surface.

Practical control means will now be explained.

Figure 7:
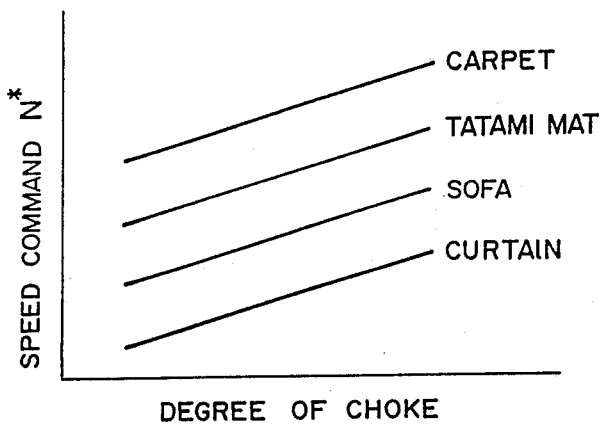
FIG. 7 is a diagram showing a function table in accordance with the cleaning surface.

FIG. 7 shows control patterns stored in the ROM 13b in the microcomputer 13. Practically speaking, these patterns are stored as the function tables 22 corresponding to the respective cleaning surfaces. In this diagram, an axis of abscissa denotes a degree of the choking state and an axis of ordinate indicates a speed command N*. The rotational speed is set from the foregoing necessary rotational speeds in accordance with the order of carpet, tatami mat, sofa, and curtain and is set so as to increase as the choking state progresses. Due to this, the function in the function table 22 is automatically set in accordance with the cleaning surface. The cleaning surface such as a carpet or the like is not limited to the carpet. It is also possible to consider in a manner such that the function for a carpet is used in the case of the cleaning surface having a characteristic similar to that of the carpet. The same shall also apply to the cases of tatami mat, sofa, and curtain. Further, by calculating the speed command N* in accordance with the degree of choking state, the speed command N* corresponding to not only the presumed cleaning surface but also the degree of choking state is derived and the optimum control can be accomplished.

Figure 8:
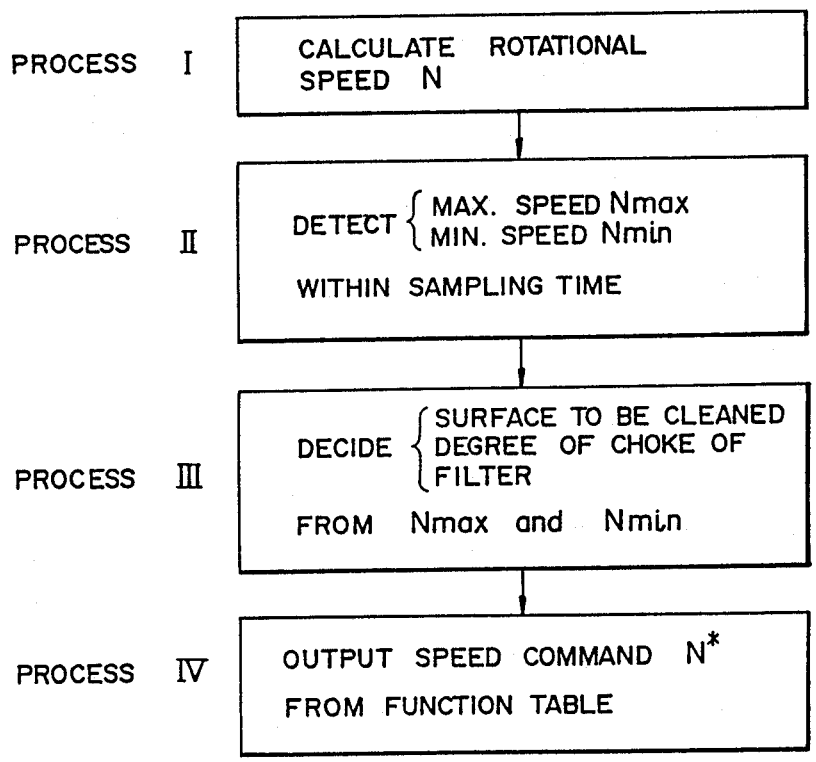
FIG. 8 is a diagram showing the processing contents which are executed by a microcomputer.

FIG. 8 shows the content of the processes which are executed by the microcomputer 13. This diagram shows a procedure to obtain the speed command N* in accordance with the cleaning surface and the degree of choking state.

In the process I, the rotational speed of the motor 9 which changes with an elapse of time is calculated using the position detection signal 12S.

In the process II, the maximum speed $N_{max}$ and the minimum speed $N_{min}$ within a sampling time T are detected.

In the process III, the mode of the rotational vibration, namely, the vibration frequency and the value of amplitude within the sampling time are compared with the vibration mode (fluctuation mode of the speed) which has previously been stored in the ROM 13b, thereby presuming the cleaning surface and deciding the degree of choking state from the rotational speeds $N_{max}$ and $N_{min}$.

In the process IV, a predetermined value corresponding to the choking state is selected from the function table 22 selected on the basis of the cleaning surface and the degree of choking state, thereby obtaining the speed command N* in accordance with this value.

Figure 9:
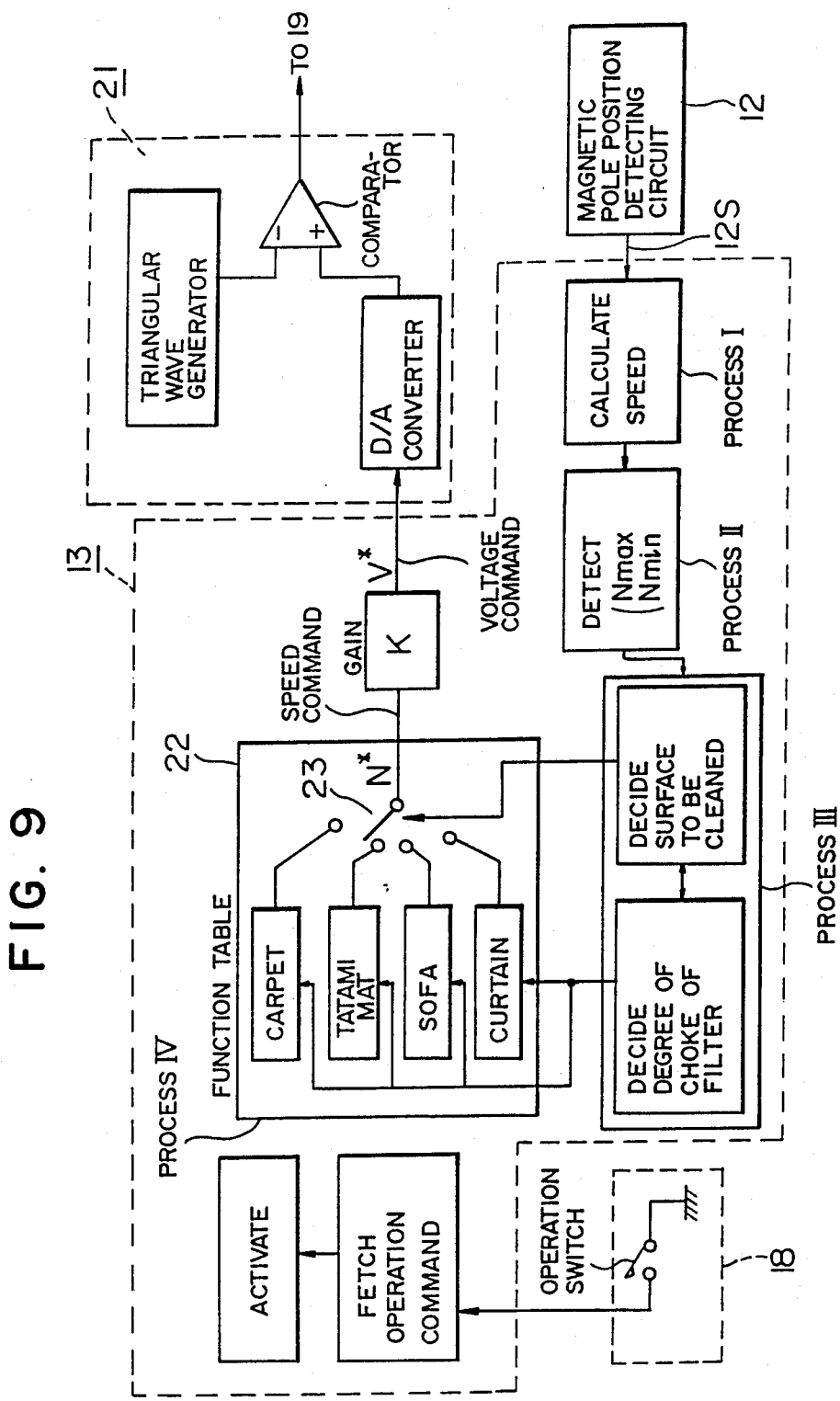
FIG. 9 is a control block diagram of an apparatus to drive the vacuum cleaner showing an embodiment of the invention.

A control circuit to realize this processing method will now be explained with reference to FIG. 9. Various kinds of speed control systems such as ASR, ACR, and the like are considered. In FIG. 9, the voltage controlled system of a closed loop is shown. In the diagram, when the user of the cleaner turns on the operation switch 18, an operation command is fetched to start the brushless DC motor 9. When the rotational speed rises to a predetermined speed, the activating process is finished. Thereafter, the processes to presume the cleaning surface and to detect the degree of choking state are executed.

The microcomputer 13 shown in FIGS. 2 and 9 receives the position detection signal 12S from the magnetic pole position detecting circuit 12 and calculates the rotational speed in the process I in FIG. 8. In the next process II, the maximum speed $N_{max}$ and the minimum speed $N_{min}$ detected. Further, the microcomputer 13 presumes the cleaning surface and decides the choking state in the process III on the basis of the detected maximum and minimum speeds. Subsequently, in the process IV, a predetermined function table 22 is selected by a switch 23 in accordance with the cleaning surface and choking state. The speed command N* is obtained on the basis of a predetermined speed command value in the function table 22 selected in accordance with the degree of choking state of the filter. The speed command N* is converted into a voltage command V* by a gain K. The voltage command V* is input to a D/A converter. An output of the D/A converter is compared with an output of a triangular wave generator, which is provided separately from the D/A converter, by a comparator provided at the post stage. An output corresponding to the difference between those outputs is supplied to the base driver 19. The base driver 19 applies the voltage based on the voltage command which was determined at the front stage to the motor 9.

In this manner, the motor 9 is rotated at the speed in response to the speed command N* according to the cleaning surface and the degree of choking state.

Figure 10:
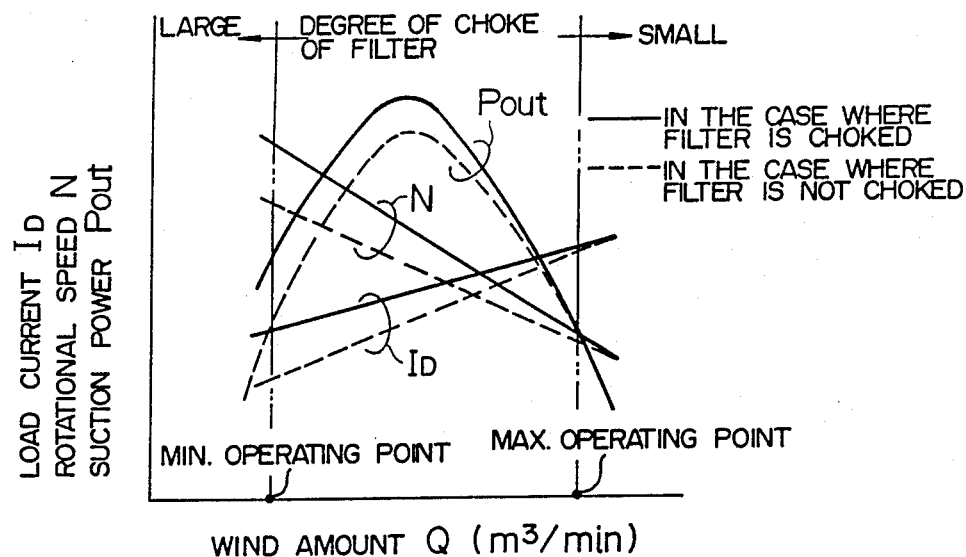
FIG. 10 is a diagram showing performance curves in dependence on the presence or absence of the choke of the filter.

FIG. 10 shows performance curves of a cleaner (electric blower) using the motor 9 which is controlled as explained above as the motor to drive the vacuum cleaner. FIG. 10 is simimar to that described in FIG. 3. In FIG. 10, broken lines indicate the case where the filter is not choked and solid lines represent the case where the filter is choked. As is obvious from this diagram, as the choking state of the filter progresses, by detecting this choking state and by increasing the rotational speed in accordance with the degree of choking state, the suction power $P_{out}$ which was reduced due to the choke can be raised as shown by the solid lines, so that the vacuum cleaner of a high efficiency can be obtained.

Figure 11:
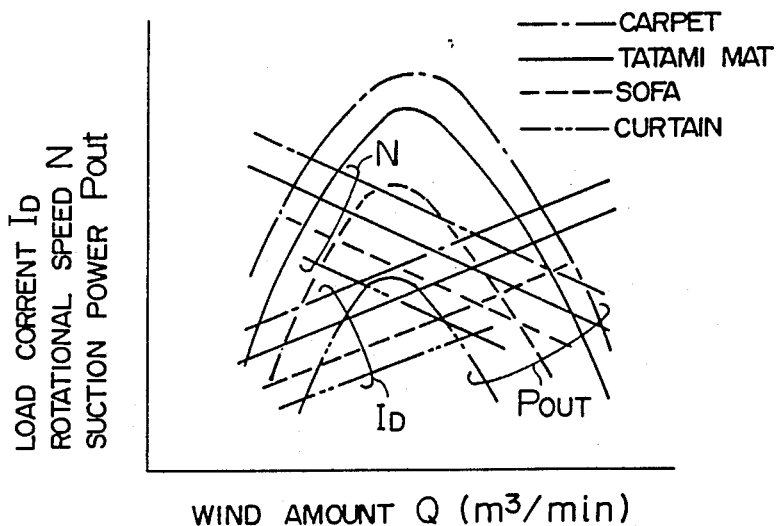
FIG. 11 is a diagram showing performance curves to the cleaning surface.

FIG. 11 similarly shows a change in performance to the cleaning surface. This diagram shows changes in suction power $P_{out}$, rotational speed N, and load current $I_D$ which are necessary in accordance with the cleaning surface. The optimum rotational speed N* is given in accordance with the characteristic responsive to the choking state on the basis of the function table 22 corresponding to the cleaning surface.

Although the control of the cleaner has been accomplished by only the brushless DC motor 9, it can be also attained by the variable speed motor.

Figure 12:
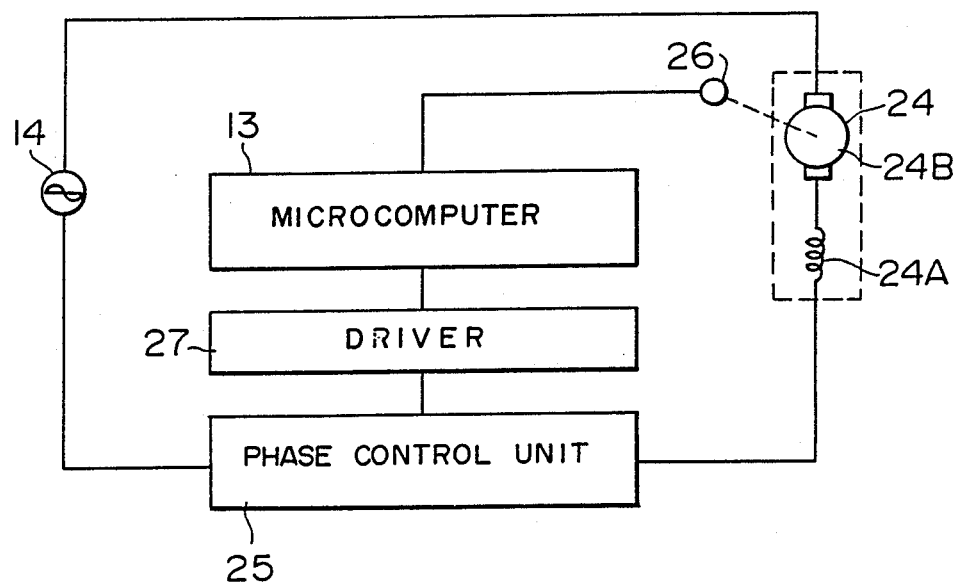
FIG. 12 is a control block diagram showing another embodiment (1) of the present invention.

FIG. 12 shows another embodiment (1) of the invention. In the diagram, a phase controlled AC commutator motor 24 comprises a field winding 24A and an armature 24B. The motor 24 is connected to the AC power source 14 through a phase control unit 25 including a control device such as triac, FLS, thyristor, or the like. An ignition angle of a gate of the control device of the phase control unit 25 is controlled by a driver 27 similar to the base driver 19 shown in FIG. 2. The microcomputer 13 also has the processing function similar to that mentioned above. Namely, the microcomputer 13 presumes the cleaning surface on the basis of the maximum speed $N_{max}$ and the minimum speed $N_{min}$ within the sampling time on the basis of the rotation information (mainly, rotational speed information) derived from a rotation detector 26, thereby producing a gate signal of the control device by further considering the choking state. The content of the practical processes which are executed by the microcomputer is similar to that shown in FIG. 8. In this embodiment (1), it is also possible to provide the cleaner having the optimum suction state according to the presumed cleaning surface and choking state and the cleaning efficiency does not deteriorate.

According to the foregoing embodiment, it is possible to obtain the cleaner having the optimum suction performance in accordance with the cleaning surface and the choking state of the filter. However, since the cleaning surface is presumed from the rotational speed, when it has been presumed that the cleaning surface is the tatami mat, this surface is not always the tatami mat. In other words, this presumed cleaning surface is the surface having the same surface as that of the tatami mat or the cleaning surface in the state similar to the tatami mat.

In any cases, the rotational speed is controlled in accordance with the state of the cleaning surface or controlled so as to compensate the suction performance which was deteriorated due to the choke. Thus, the optimum control of the cleaner can be automatically performed.

As is obvious from the above description, the rotational speed can, be detected by directly using the signal of the Hall device 11 in the magnetic pole position detecting circuit 12 which is generally used in, for example, the brushless DC motor 9, so that what is called a sensorless vacuum cleaner is derived.

An explanation will now be made with respect to a practical example of a vacuum cleaner in which the speed control of the brushless DC motor can be performed in the optimum condition in accordance with a change in load of the vacuum cleaner.

Figure 13:
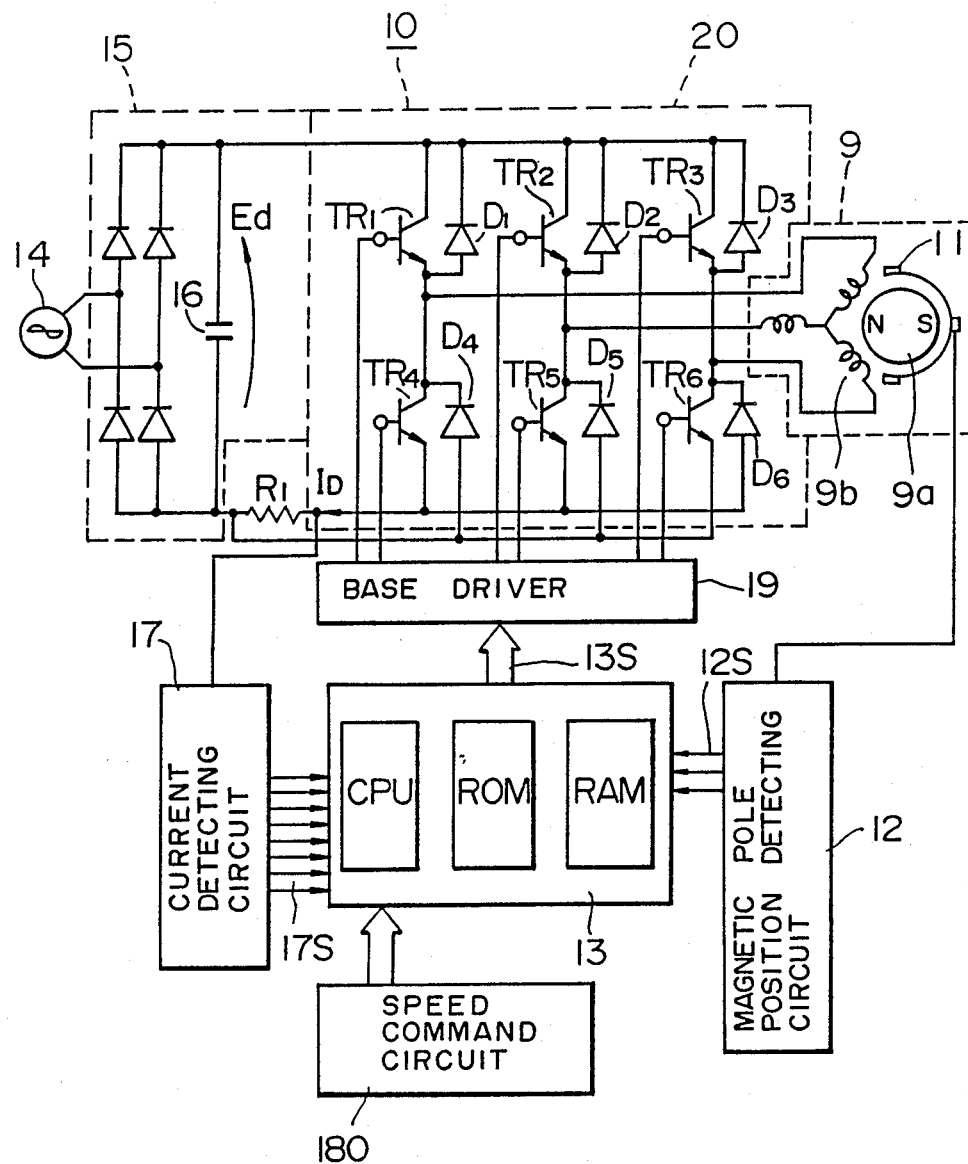
FIG. 13 is a whole constitutional diagram of a speed control unit showing another embodiment (2) of the invention.
Figure 14:
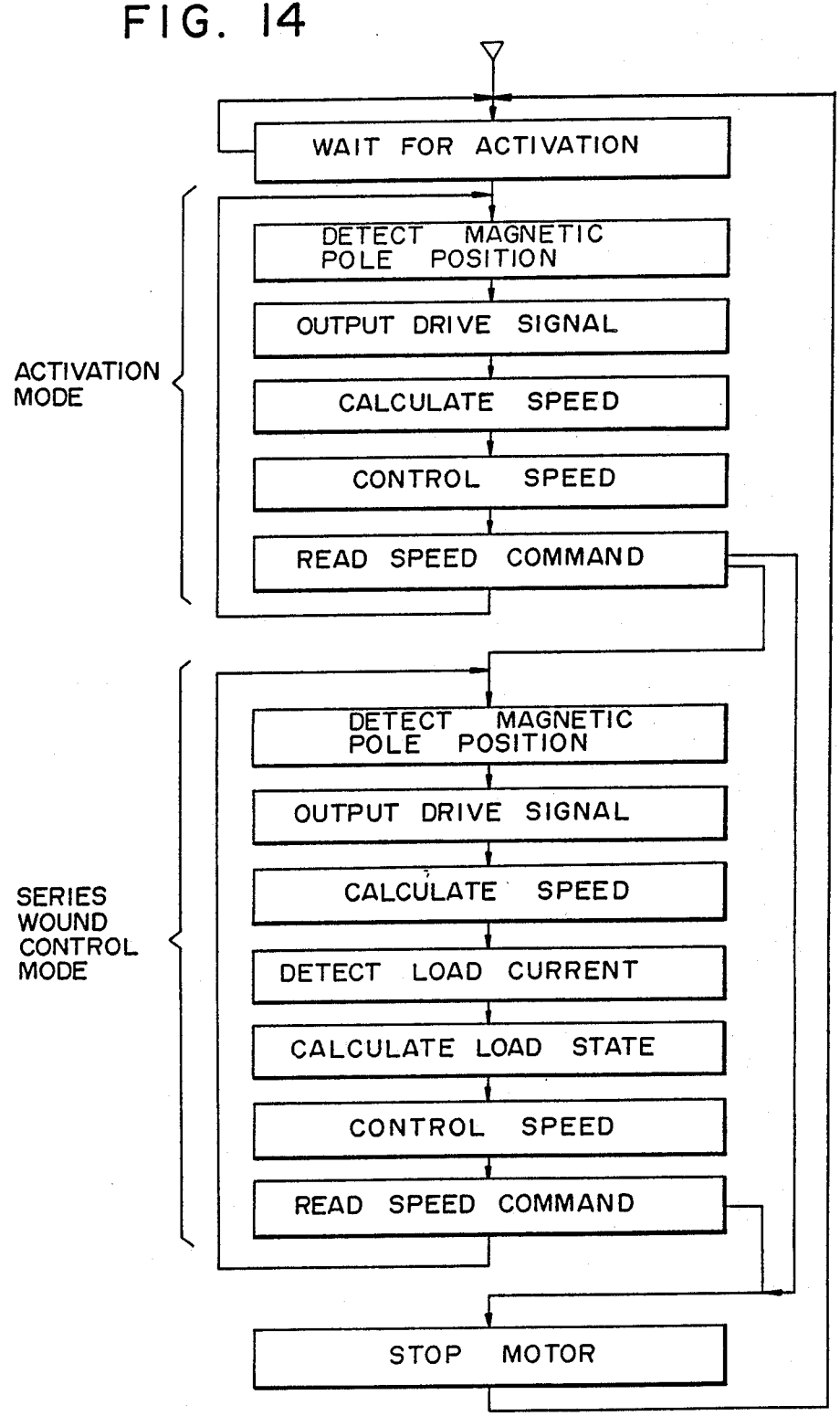
FIG. 14 is a diagram showing the processing operation of the microcomputer.
Figure 15:
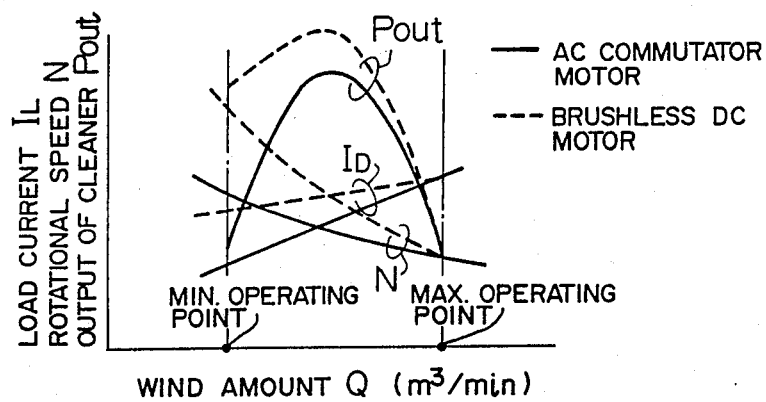
FIG. 15 is a diagram showing performance curves of the vacuum cleaner.

FIGS. 13 to 15 show another embodiment (2) of the invention. A speed control unit in this case is as shown in FIG. 13 and differs from the speed control unit shown in FIG. 2 with respect to two points that a speed command circuit 180 is used in place of the operation switch 18 and that the voltage command circuit 21 is omitted In FIG. 13, the parts and components having the same functions as those shown in FIG. 2 are designated by the same reference numerals.

FIG. 15 shows performance curves of a vacuum cleaner, in which an axis of abscissa denotes an amount Q of wind which was inhaled from the hose 2 and an axis of ordinate represents a suction power $P_{out}$ indicative of the suction performance of the cleaner and a rotational speed N and a load current $I_D$ of the motor. Solid lines indicate the case where a conventional AC commutator motor was used and broken lines represent the case where the brushless DC motor was used. A range from the maximum operating point to the minimum operating point is the operating range of the vacuum cleaner.

Namely, in the case of using the conventional AC commutator motor, the suction power $P_{out}$ increases from the maximum operating point (in the state in which the suction port of the hose was removed from an object to be cleaned, or the like) with a decrease in wind amount and becomes the maximum value. When the wind amount further decreases, the suction power $P_{out}$ is reduced and reaches the minimum operating point (in the state in which the filter was choked, the suction port was closed, or the like). In general, in the case where a tatami mat or carpet is cleaned, the operating point is located on the side where the wind amount is small from the maximum point of the suction $P_{out}$ and the cleaner is actually used in the range where the suction power $P_{out}$ is small. Therefore, when the cleaner had inhaled the dusts and the dusts were accumulated, the suction capability of the vacuum cleaner largely deteriorates. This is because since the load current $I_D$ of the AC commutator motor decreases with a reduction in wind amount and an increase degree of the rotational speed in the range from the maximum operating point to the minimum operating point is small, the output of the motor is reduced.

Therefore, it is sufficient for the vacuum cleaner to rotate the fan at a high speed in response to the decrease in wind amount. When the fan is rotated at a high speed, a torque T also increases. In other words, the current also rises. Therefore, as shown in FIG. 15, although the brushless DC motor generally exhibits the shunt characteristic, by performing the series wound control such as to increase the rotational speed with a decrease in wind amount, the motor can obtain a characteristic as shown by broken lines. Thus, there is an effect such that the suction power $P_{out}$ at an operating point near the minimum operating point can be improved.

FIG. 14 shows the order of the processing operations which are executed by the microcomputer.

Namely, when a start command is input, the motor is rotated to a predetermined rotational speed. Thereafter, by performing the series wound control by detecting the load state, the characteristic as shown in FIG. 15 is derived.

Practically speaking, the state in which the motor is held in the standby mode until a start command is input is repeated. When the speed command serving as a reference speed is input from the speed command circuit 180 to the microcomputer 13, the microcomputer 13 detects the position of the magnetic pole and outputs a position detection signal and controls the speed (controls the voltage or current which is applied to the motor) on the basis of the calculated speed. The activation mode is repeated until the rotational speed reaches the speed command value. When the rotational speed has reached the speed command value, the microcomputer 13 enters the series wound control mode and detects the position of the magnetic pole and outputs the position detection signal. Then, the microcomputer calculates the load state of the cleaner on the basis of the result of the speed obtained and the detection value of the load current and controls the speed on the basis of the load state obtained so as to exhibit a predetermined series wound characteristic. The series wound control mode is repeated. The actual speed is compared with the speed command value in each mode. When no speed command exists (i.e., when a stop command is input), the motor is stopped and the motor is set into the standby mode to wait for the input of a start command. These operations are repeated. Thus, it is possible to provide a vacuum cleaner which can increase the power (improve the suction power indicative of the suction performance) of the cleaner.

Figure 16:
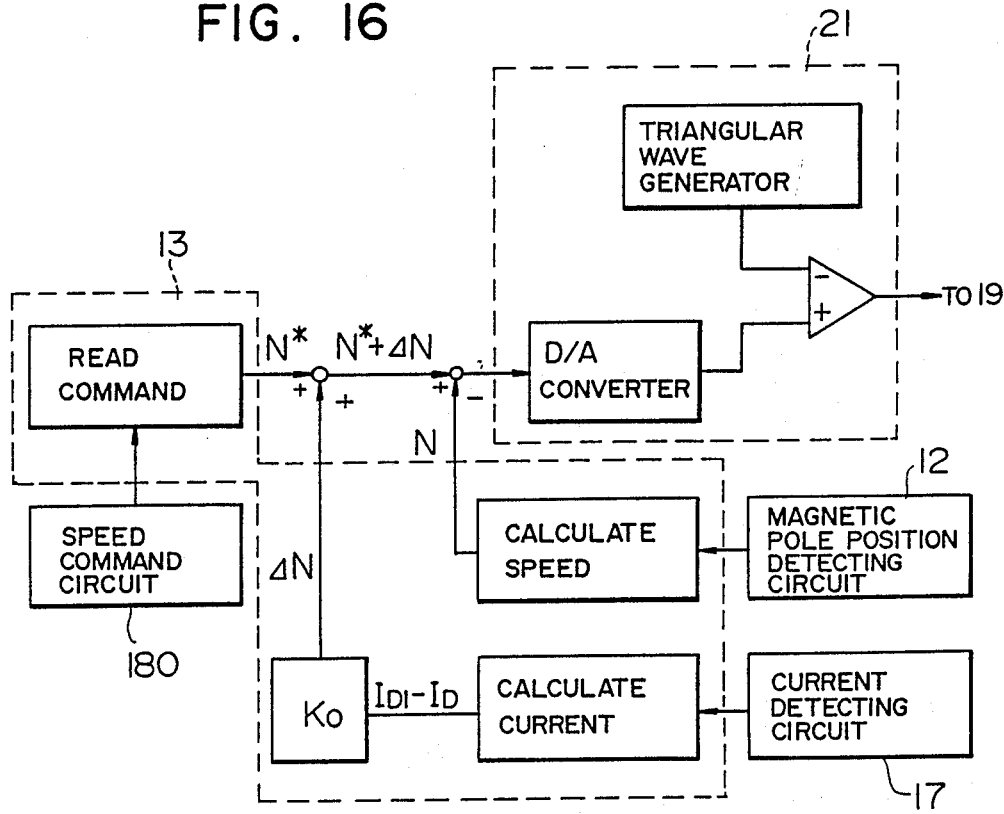
FIGS. 16 to 18 are diagrams showing another embodiment (3) of the invention.
Figure 17:
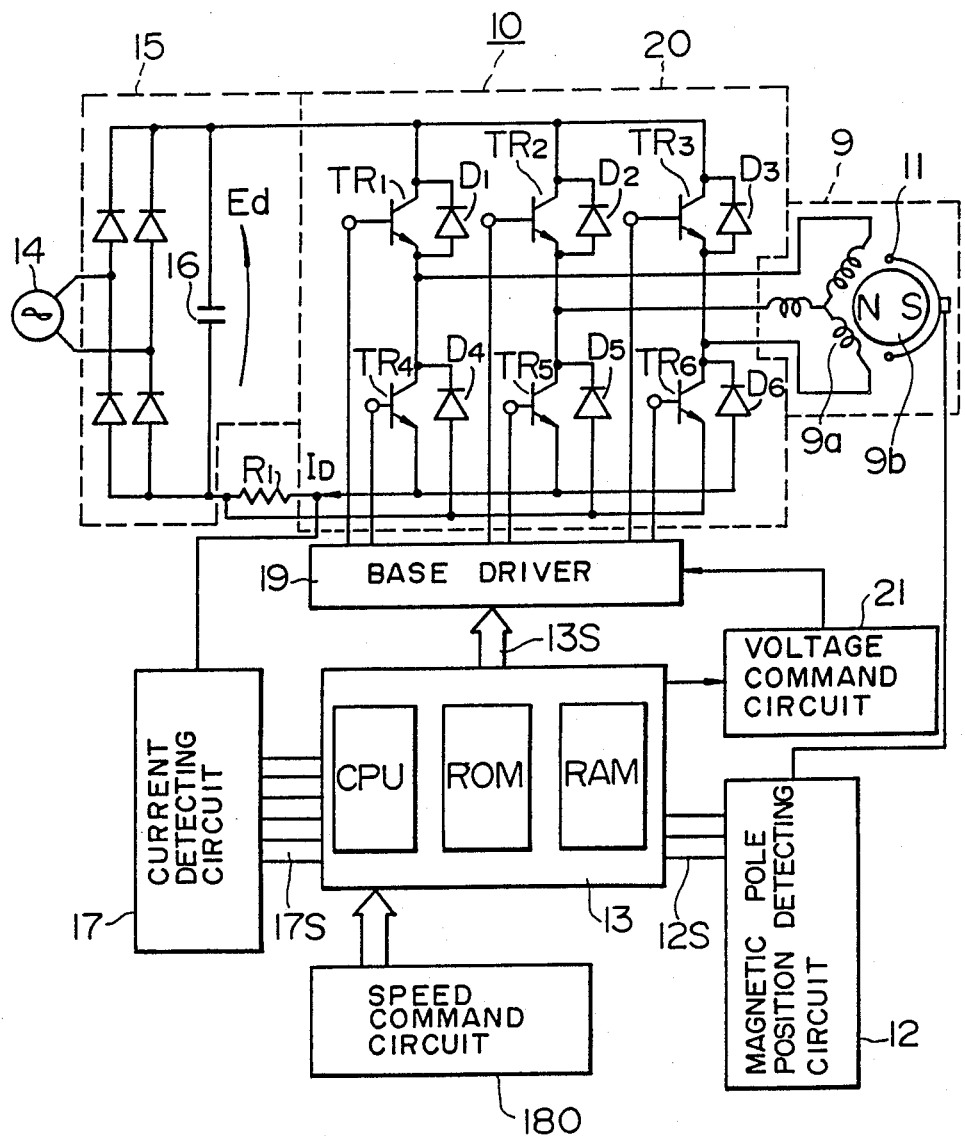
Figure 18:
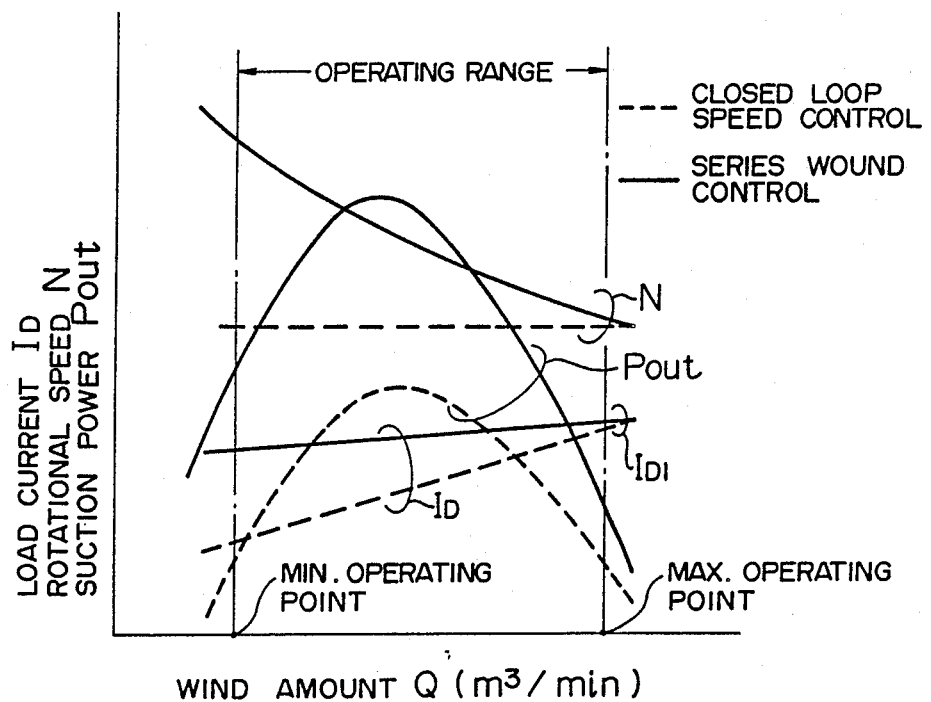

FIGS. 16 to 18 show another embodiment (3) of the invention. In this case, a speed control unit is as shown in FIG. 17 and differs from the speed control unit shown in FIG. 13 with respect to a point that the voltage command circuit 21 is provided. In FIG. 17, the parts and components having the same functions as those shown in FIG. 13 are designated by the same reference numerals.

In FIG. 16, when a command is input from the speed command circuit 180 to the microcomputer 13, the microcomputer 13 reads the command and outputs a speed command N*. The speed command N* is input to a D/A converter of the voltage command circuit 21. An output of the D/A converter is compared with an output of the triangular wave generator by the comparator. An output of the comparator is input to the base driver 17, so that the voltage which is applied to the motor 9 is determined. In response to the position detection signal 12S from the magnetic pole position detecting circuit 12, the microcomputer 13 calculates the rotational speed N. The speed N is compared with the command value N''. Thus, the motor 9 is controlled so as to always rotate at the speed instructed by the speed command N*.

Further, the current detection signal 17S of the current detecting circuit 17 is input to the microcomputer 13. The microcomputer 13 calculates the load current $I_D$ and obtains the difference ($I_{D1}$-$I_D$) between a reference value $I_{D1}$ and the load current $I_D$. The microcomputer 13 also calculates $\Delta N$ by a gain $K_0$ and is added to the speed command N*. Thus, the speed command N* is corrected by the value of the load current $I_D$ corresponding to the load change and the motor 9 is operated by the closed loop speed control on the basis of the new speed command N*+ΔN. Therefore, the rotational speed increases with a decrease in load current $I_D$, so that the series wound characteristic is derived. There is an effect such that a vacuum cleaner having the improved suction performance is obtained.

FIG. 18 shows performance curves of a vacuum cleaner in which a brushless DC motor is driven by a speed control unit according to the invention. In the diagram, an axis of abscissa denotes an amount Q of wind which passes in the vacuum cleaner and an axis of ordinate represents a suction power $P_{out}$ indicative of the suction performance of the vacuum cleaner, a rotational speed N and a load current $I_D$ of the motor. The range from the maximum operating point to the minimum operating point is the operating range of the vacuum cleaner. Broken lines indicate the case where the motor was continuously operated by the ordinary closed loop speed control. Since the rotational speed N is constant to a change in wind amount Q, the suction power $P_{out}$ is small and a desired performance as the vacuum cleaner is not obtained. On the other hand, solid lines show the case where the motor was operated by the closed loop speed control of this embodiment. Since the speed correction amount ΔN is obtained from the difference ($I_{D1}-I_D$) corresponding to the decreased amount of the load current $I_D$ from the reference load current $I_{D1}$ due to the change in wind amount Q, the rotational speed increases in a square manner (i.e. in an accelerated manner) with a decrease in wind amount Q. Thus, there is an effect such that a vacuum cleaner in which the suction power $P_{out}$ is large and the suction performance is improved is derived.

Figure 19:
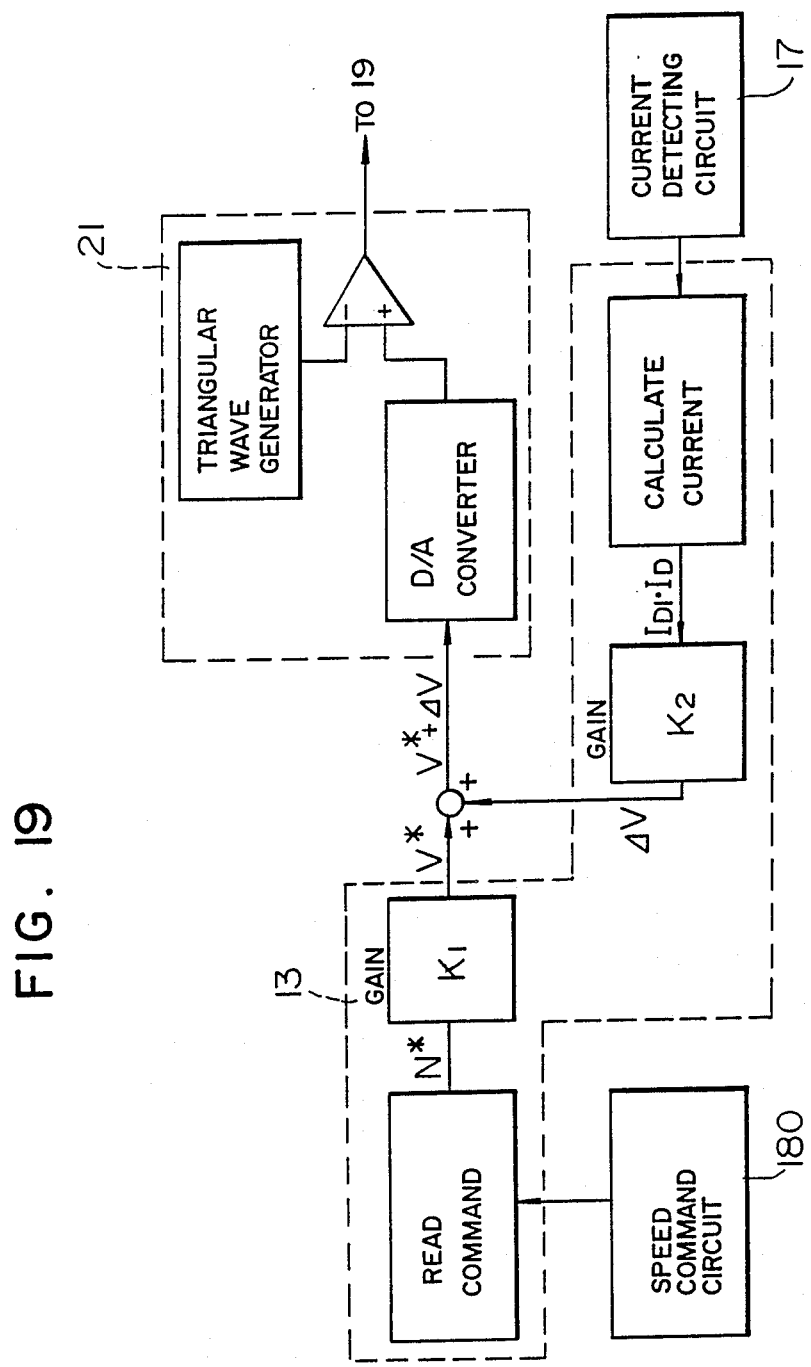
FIGS. 19 and 20 are diagrams showing another embodiment (4) of the invention.
Figure 20:
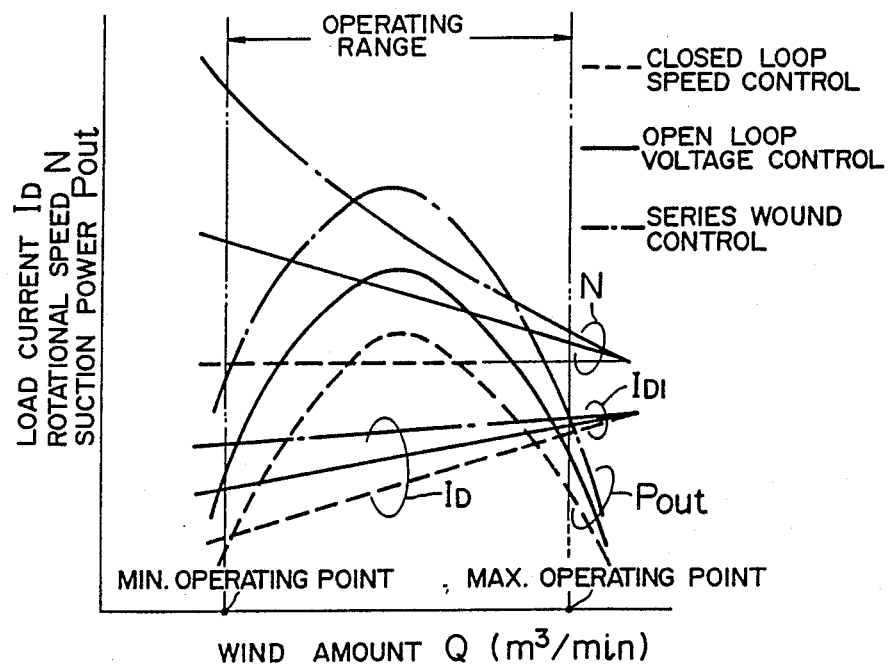

FIGS. 19 and 20 show another embodiment (4) of the invention. In this case, a speed control unit uses the speed control unit shown in FIG. 17. In FIG. 19, when a command is input from the speed command circuit 180 to the microcomputer 13, the microcomputer 13 reads the command and determines the speed command N* and outputs the voltage command V* by a gain $K_1$. The voltage command V* is input to the D/A converter of the voltage command circuit 21. An output of the D/A converter and an output of the triangular wave generator are compared by the comparator. An output of the comparator is input to the base driver 19, so that the voltage which is applied to the brushless DC motor 9 is decided. Thus, the motor 9 is operated by the closed loop voltage control based on the speed command N*. Therefore, the rotational speed changes by the drooping characteristic of the motor in dependence on the load change of the cleaner (for example, the change of the surface to be cleaned when the filter of the cleaner main body is choked and the suction port is in contact with the floor surface, or the like). When the load is light, the rotational speed increases. When the load is heavy, the speed decreases. Namely, the same characteristic as that of the AC commutator motor which is used in a current vacuum cleaner is obtained. There is an effect such that the motor control suitable for the vacuum cleaner can be performed.

Further, an output of the current detecting circuit 17 is input to the microcomputer 13. The microcomputer 13 calculates the load current $I_D$ and obtains the difference ($I_{D1}-I_D$) between the reference value $I_{D1}$ the load current $I_D$. ΔV is calculated by a gain $K_2$ and added to the voltage command V*. Thus, the voltage command V* is corrected (in other words, the speed command N* is corrected) by the value of the load current $I_D$ corresponding to the load change and the brushless DC motor 9 is operated by the open loop voltage control on the basis of the new voltage command V*+ΔV. Thus, there are effects such that the variable range of the rotational speed is widened, the series wound characteristic is accomplished, and a vacuum cleaner in which the suction performance is improved is obtained.

FIG. 20 shows performance curves of a vacuum cleaner in which a brushless DC motor was driven by the speed control unit of the invention. In the diagram, an axis of abscissa denotes an amount Q of wind which passes in the vacuum cleaner and an axis of ordinate represents a suction power $P_{out}$ representative of the suction performance of the vacuum cleaner, a rotational speed N and a load current $I_D$ of the motor. The range from the maximum operating point to the minimum operating point is the operating range of the vacuum cleaner. Broken lines indicate the case where the motor was operated by the ordinary closed loop speed control. Since the rotational speed N is constant to a change in wind amount Q, the suction power $P_{out}$ is small and a desired performance as the vacuum cleaner is not derived. On the other hand, solid lines show the case where the motor was operated by the open loop voltage control of the invention. Since the rotational speed increases with a decrease in wind amount Q, the suction power $P_{out}$ is large and a desired performance as the vacuum cleaner is derived. Further, alternate long and short dash lines represent the case where the motor was operated by the series wound control of the invention. The voltage correction amount ΔV is derived from the difference ($I_{D1}-I_D$) corresponding to the decreased amount of the load current $I_D$ from the reference load current $I_{D1}$ due to the change in wind amount Q, so that the rotational speed increases in a sequare manner with a decrease in wind amount Q. Thus, there are effects such that the suction power $P_{out}$ further rises and the vacuum cleaner in which the suction performance is improved is obtained.

Figure 21:
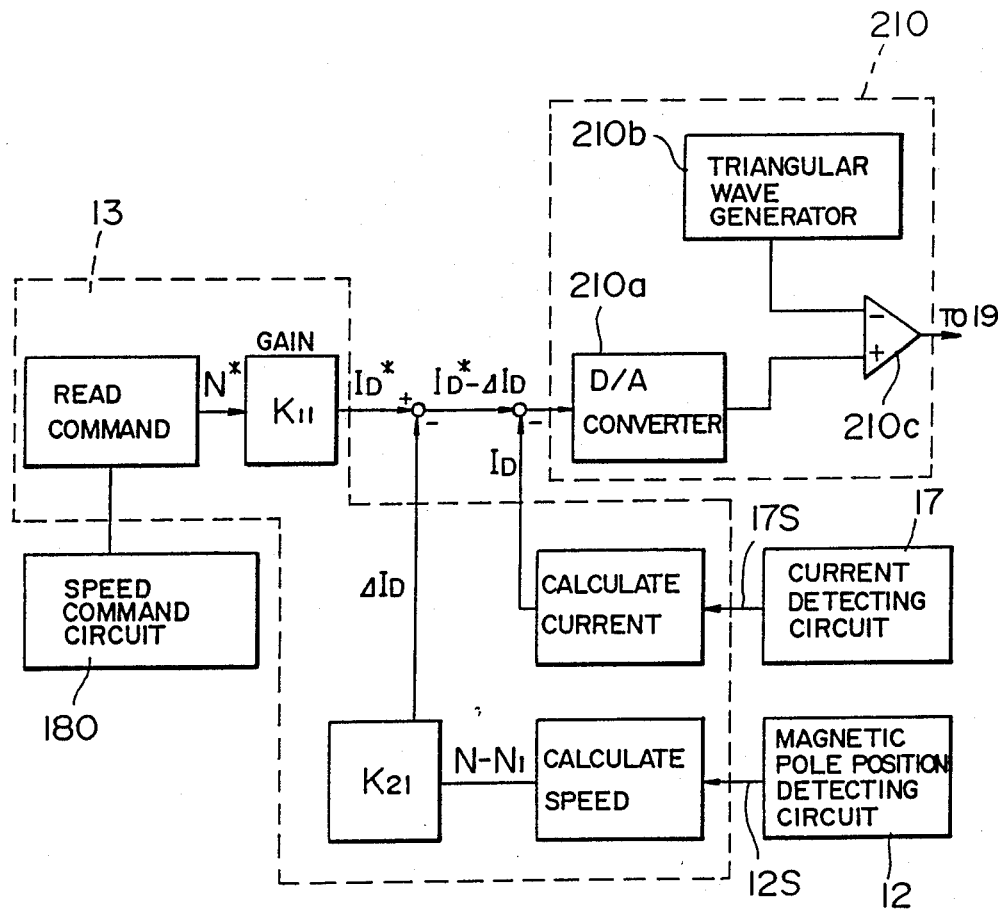
FIGS. 21 to 23 are diagrams showing another embodiment (5) of the invention.
Figure 22:
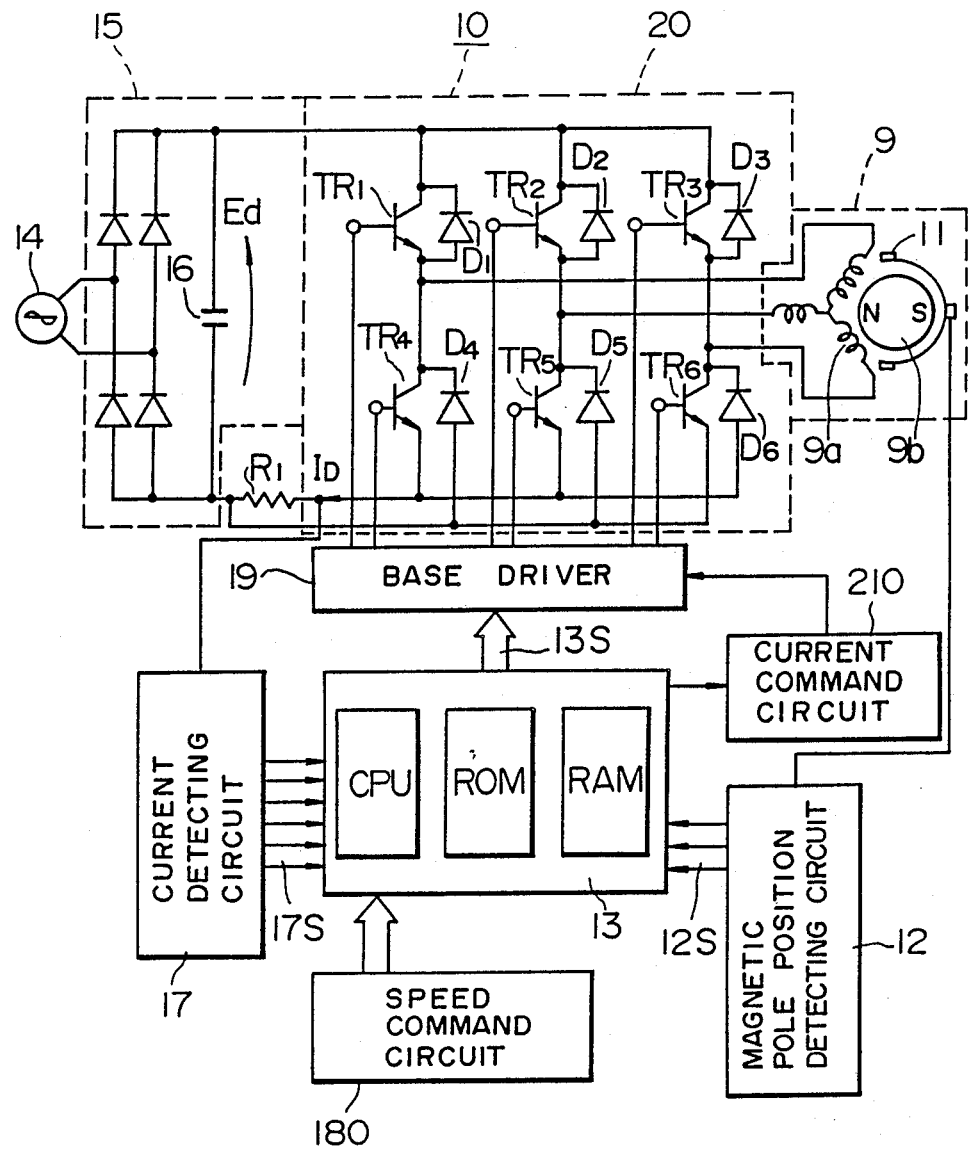
Figure 23:
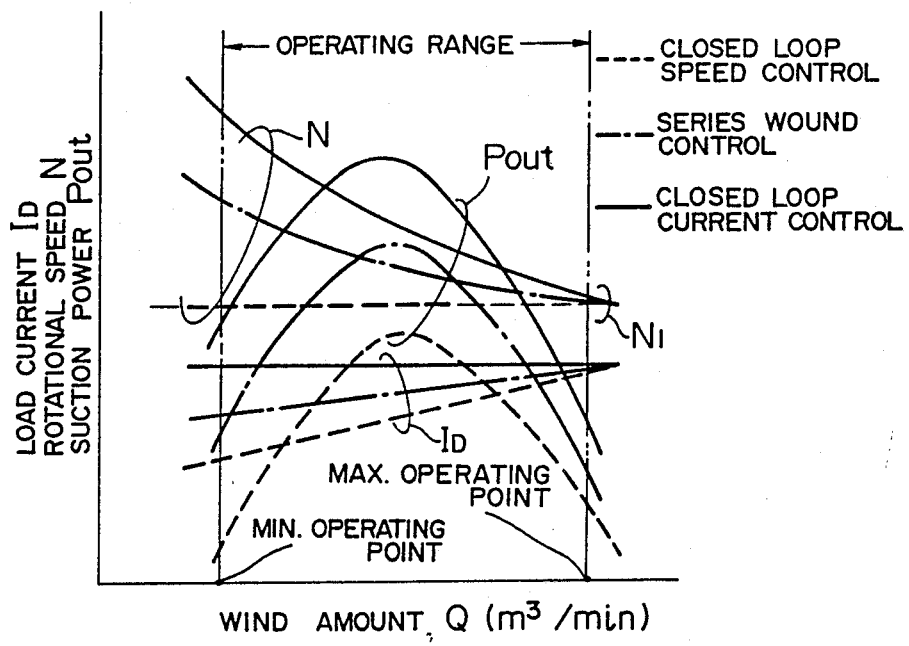

FIGS. 21 to 23 show another embodiment (5) of the invention. In this case, a speed control unit is as shown in FIG. 22 and differs from the speed control unit shown in FIG. 17 with respect to a point that a current command circuit 210 is used in place of the voltage command circuit 21. In FIG. 22, the parts and components having the same functions as those shown in FIG. 17 are designated by the same reference numerals.

In FIG. 21, when a command is input from the speed command circuit 180 to the microcomputer 13, the microcomputer 13 reads this command and decides the speed command N* and outputs a current command $I_D$* by a gain $K_{11}$. The current command $I_D$* is input to a D/A converter 210a in the current command circuit 210. An output of the D/A converter 210a and an output of a triangular wave generator 210b are compared by a comparator 210c. An output of the comparator 210c is input to the base deriver 19 and the voltage which is applied to the brushless DC motor 9 is determined. An output of the current detecting circuit 17 is input to the microcomputer 13. The microcomputer 13 calculates the load current $I_D$ and compares with the current command $I_D$*. Thus, the motor 9 is controlled so as to always rotate at the speed instructed by the current command $I_D$*.

Further, in response to a detection signal from the magnetic pole position detecting circuit 12, the microcomputer 13 calculates the speed and obtains the difference $(N-N_1)$ between the rotational speed N and the reference value $N_1$ and obtains $\Delta I_D$ by a gain $K_{21}$ and compares with the current command $I_D^*$. Thus, the current command $I_D^*$ is corrected (in other words, the speed command is corrected) by the value of the rotational speed N corresponding to the load change and the motor 9 is operated by the closed loop current control (this control is referred to as the series wound control) on the basis of the new current command $I_D^*-\Delta I_D$, so that the variable range of the rotational speed is widened.

FIG. 23 shows performance curves of a vacuum cleaner in which the brushless DC motor was driven by the speed control unit of the invention. In the diagram, an axis of abscissa denotes an amount Q of wind which passes in the vacuum cleaner and an axis of ordinate indicates a suction power $P_{out}$ representative of the suction performance of the vacuum cleaner, a rotational speed N and a load current $I_D$ of the motor. The range from the maximum operating point to the minimum operating point is the operating range of the vacuum cleaner. Broken lines indicate the case where the motor was operated by the ordinary closed loop speed control. Since the rotational speed N is constant to a change in wind amount Q, the suction power $P_{out}$ is small and a desired performance as the vacuum cleaner is not obtained. On the other hand, solid lines show the case where the motor was operated by the closed loop current control of the invention. When the wind amount Q decreases, the load torque is also reduced. Therefore, when the closed loop current control is performed, the rotational speed N increases in a square manner with a decrease in wind amount Q, so that the suction power $P_{out}$ is large and a desired performance as the vacuum cleaner is obtained. Further, alternate long and short dash lines indicate the case where the motor was operated by the series wound control of the invention. The current correction amount $\Delta I_D$ is obtained from the difference $(N-N_1)$ corresponding to the increased amount of the rotational speed N from the reference rotational speed $N_1$ due to the change in wind amount Q and compared with the current command $I_D^*$. Thus, an increase in rotational speed N due to a change in wind amount Q can be suppressed and the series wound characteristic can be obtained. By arbitrarily setting the current correction amount $\Delta I_D$, the change range of the rotational speed N can be widened. Thus, there are effects such that the change range of the rotational speed is widened and the suction power $P_{out}$ can be arbitrarily adjusted and the vacuum cleaner in which the suction performance is improved is obtained.

FIGS. 24 to 27 show another embodiment (6) of the invention. In this case, a speed control unit uses the speed control unit shown in FIG. 17.

Figure 24:
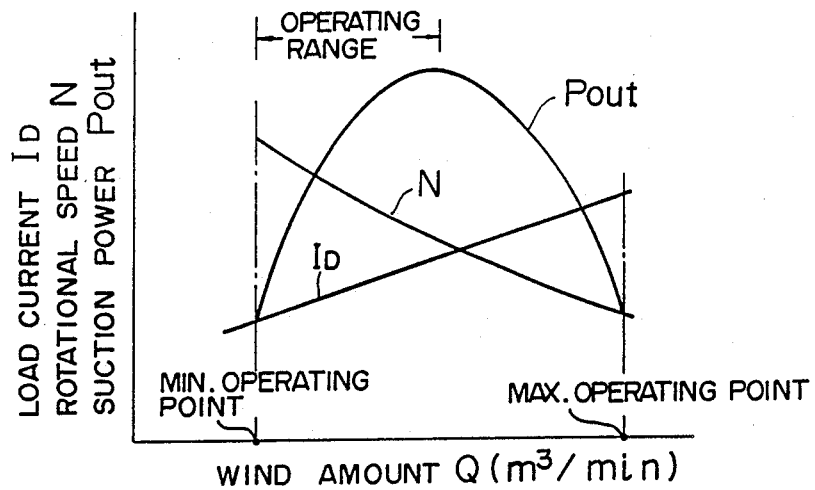
FIGS. 24 to 27 are diagrams showing another embodiment (6) of the invention.

FIG. 24 shows performance curves of a vacuum cleaner in which a brushless DC motor is used in a drive source. In the diagram, an axis of abscissa denotes an amount Q of wind which passes in the vacuum cleaner and an axis of ordinate indicates a suction power $P_{out}$ representative of the suction performance of the vacuum cleaner, a rotational speed N and a load current $I_D$ of the motor. The range from the maximum operating point to the minimum operating point is the operating range of the vacuum cleaner. The position near the maximum operating point corresponds to the state in which the suction port is away from the surface to be cleaned and at this time, the maximum electric power is needed. On the other hand, the position near the minimum operating point corresponds to the state in which the suction port is closely come into contact with the floor surface and at this time, the electric power is minimum.

The load state of the vacuum cleaner is light in the case of the floor surface such as, e.g., tatami mat, carpet, etc. and the position near the maximum suction power corresponds to the operating point. Namely, the substantial operating range falls within a range from the point of the maximum suction power to the minimum operating point. On the other hand, as mentioned before, the position near the minimum operating point corresponds to the state in which the suction port is closely come into contact with the floor surface. Therefore, the cleaning work as the cleaner is not performed. On the contrary, the suction port is hardly removed from the floor surface and it is hard for the user to handle the cleaner to perform the cleaning.

To avoid such a problem, in order to effectively use the electric power, according to the invention, when the user is performing the cleaning work while inhaling the dusts by the cleaner, the brushless DC motor is rotated at the full power and the electric power is saved in the other cases.

Figure 25:
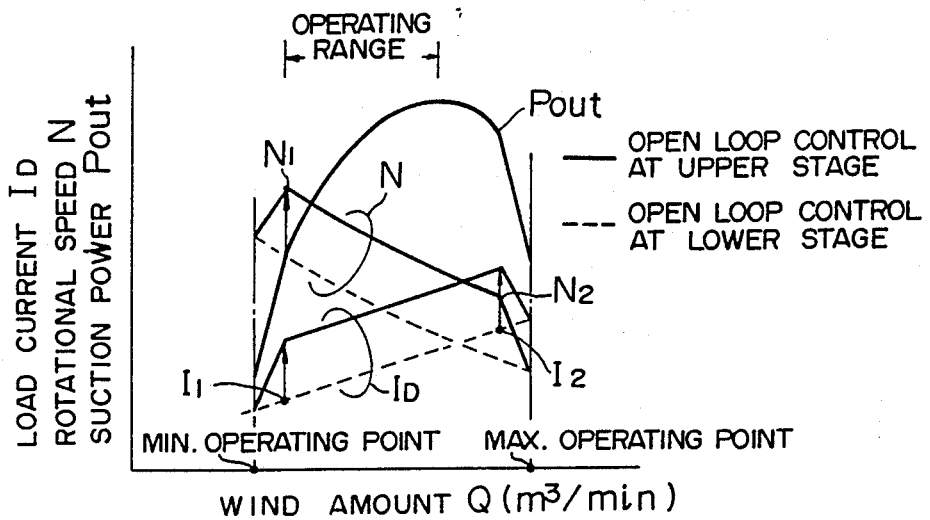

FIG. 25 shows performance curves of a vacuum cleaner having the power saving function. In the diagram, an axis of abscissa and an axis of ordinate indicate the same contents as those shown in FIG. 24. Broken lines show the case where the power saving was performed by the low output open loop control. Solid lines represent the case where the speed control was performed by high output open loop control. Namely, the rotational speed of the brushless DC motor is increased to the speed at the maximum operating point $A_2$ by an inverter control unit and the speed control is performed by the low output open loop. At this time, the motor is in the power saving state and the rotational speed is low, so that the level of the sound which is generated from the cleaner can be reduced and at the same time, the electric power consumption can be saved. Next, since the speed control is executed by the open loop, when the load condition changes (so as to reduce the load), the load current of the brushless DC motor decreases. When the load current $I_D$ is reduced to $I_2$, the control mode is switched from the low output open loop control to the high output open loop control and the motor is fully rotated along the solid line on which the rotational speed changes in dependence on the wind amount. On the other hand, when the rotational speed of the brushless DC motor rises and reaches $N_1$, the operating mode is also switched to the power saving state (low output open loop control). In this state, when the load condition changes so as to contrarily increase the load, the load current $I_D$ of the motor increases. When the load current $I_D$ reaches $I_1$, the control mode is again switched to the high output open loop control, and the motor is fully rotated in a manner similar to the foregoing case. When the rotational speed of the motor decreases and reaches $N_2$, the operating mode is switched to the power saving state (low output open loop control) and the motor is returned to the original state.

Thus, the load state can be discriminated without using a load state sensor (wind amount sensor or the like). Only when the user performs the cleaning work, the brushless DC motor is fully rotated and the electric power can be saved in the other cases. There are effects such that the sound level can be reduced and the electric power consumption can be saved in the stanby mode of the cleaner.

Figure 26:
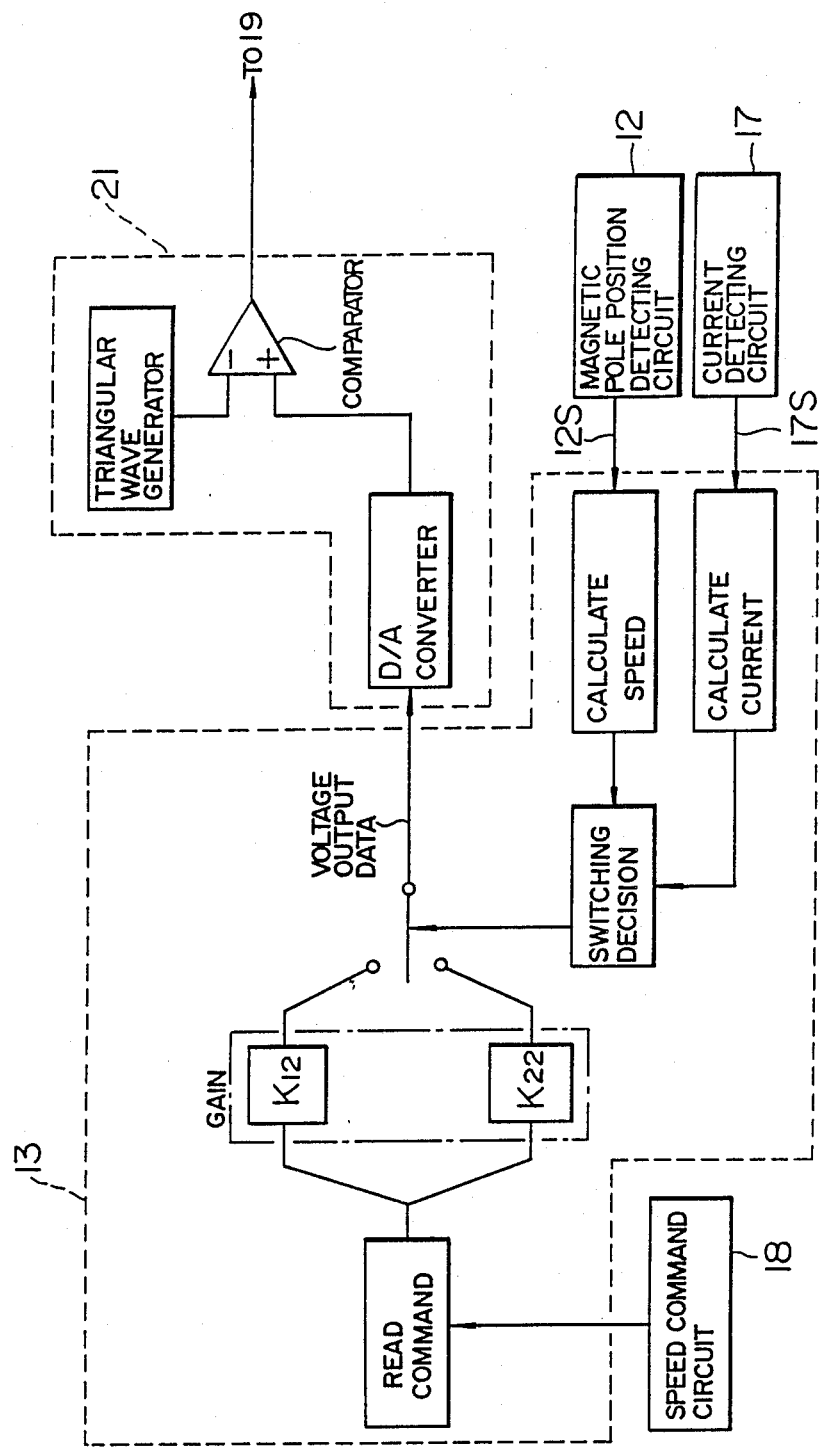

FIG. 26 is a schematic constitutional block diagram of a control circuit to accomplish the performance of FIG. 25. In the diagram, when a command is input from the speed command circuit 18 to the microcomputer 13, the microcomputer 13 reads the command and first selects a gain $K_{12}$ (gain when the low output open loop control is performed) and supplies the voltage output data to the D/A converter in the voltage command circuit 21. An output of the D/A converter is compared with an output of the triangular wave generator by the comparator. An output of the comparator is input to the base driver 19. The voltage (or current) which is applied to the brushless DC motor 9 is determined. The motor enters the power saving state.

In response to a detection signal from the magnetic pole position detecting circuit 12, the microcomputer 13 calculates the speed. In response to a detection signal from the current detecting circuit 17, the microcomputer 13 calculates the current. On the basis of the speed and current calculated, the switching state is decided. When the cleaner is set into the cleaning mode, the gain $K_{12}$ is switched to a gain $K_{22}$ (gain when the high output open loop control is performed: $K_1 < K_2$) and the brushless DC motor is fully rotated.

Figure 27:
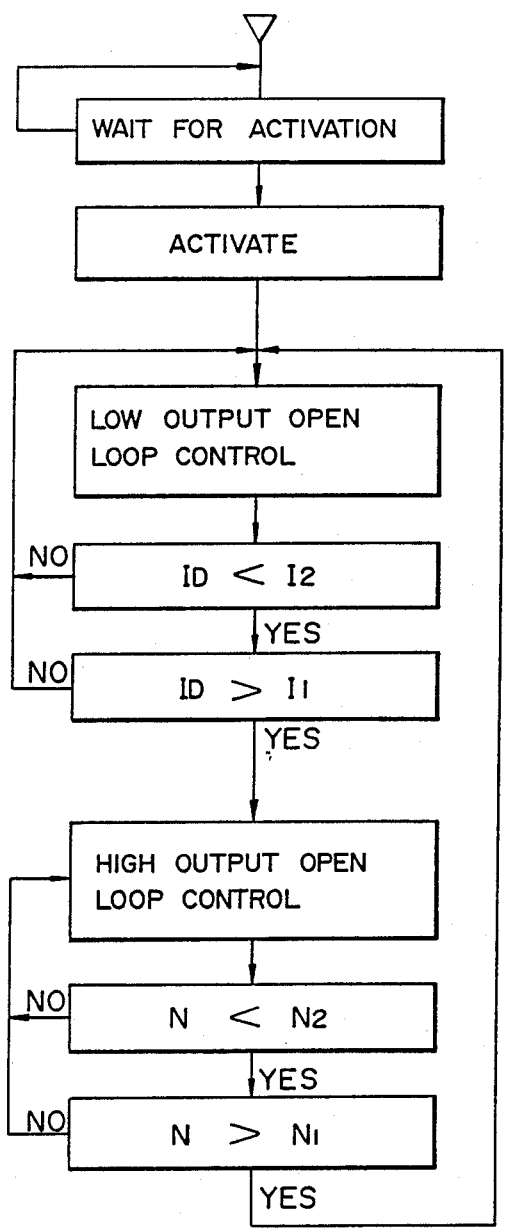

FIG. 27 shows the order of the processing operations of the microcomputer in this embodiment.

Namely, the activation waiting state is repeated. When an activation command is input, the brushless DC motor is rotated to a predetermined rotational speed (rotational speed at the maximum operating point). Then, the low output open loop control is executed and the cleaner is set into the power saving state. If the load current $I_D$ is smaller than $I_1$ or larger than $I_2$, the low output open loop control is continued. Next, when the load current $I_D$ falls within a range from $I_1$ to $I_2$ ($I_1 < I_D < I_2$), the high output open loop control is performed and the motor is fully rotated. When the rotational speed N lies within a range from $N_1$ to $N_2$ ($N_1 < N < N_2$), the high output open loop control is continued. When the rotational speed N is higher than $N_1$ or lower than $N_2$, the low output open loop control is executed and the cleaner is set into the power saving state.

Therefore, according to another embodiment (6), when the user is performing the cleaning work while inhaling the dusts by the cleaner, the motor is fully rotated and the cleaner is operated in the power saving mode in the cleaning standby mode in the other cases. Thus, there are effects such that the sound level can be reduced and the electric power consumption can be saved.

Figure 28:
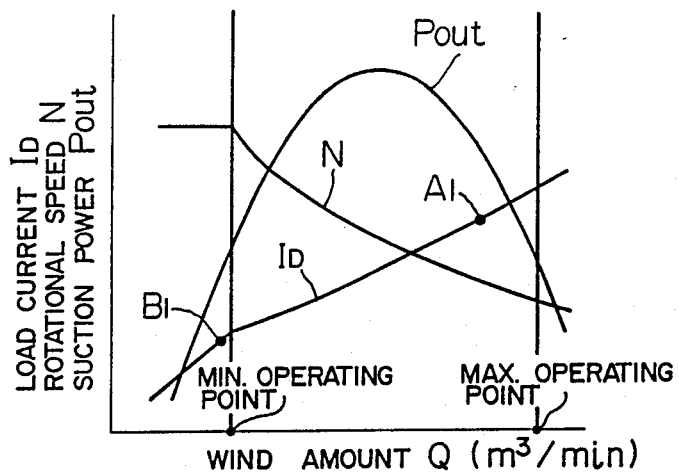
Figure 29A:
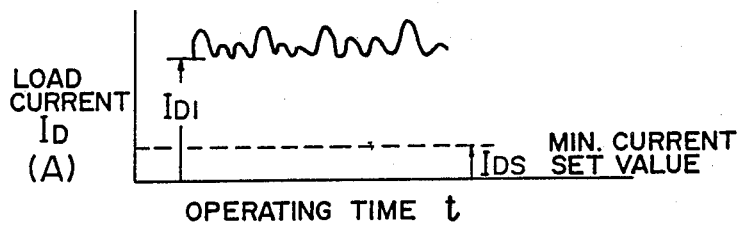
FIGS. 29A and 29B are diagrams showing changes in current to the state in which a foreign matter was inhaled into an intake air passage and to the choking state of a filter.
Figure 29B:
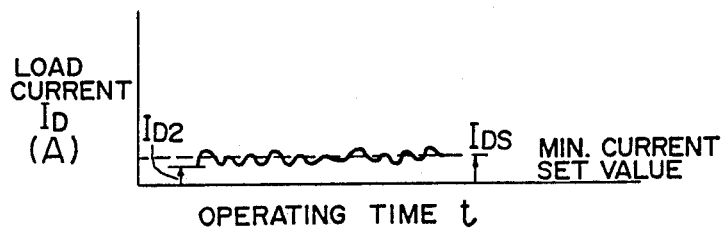
Figure 30:
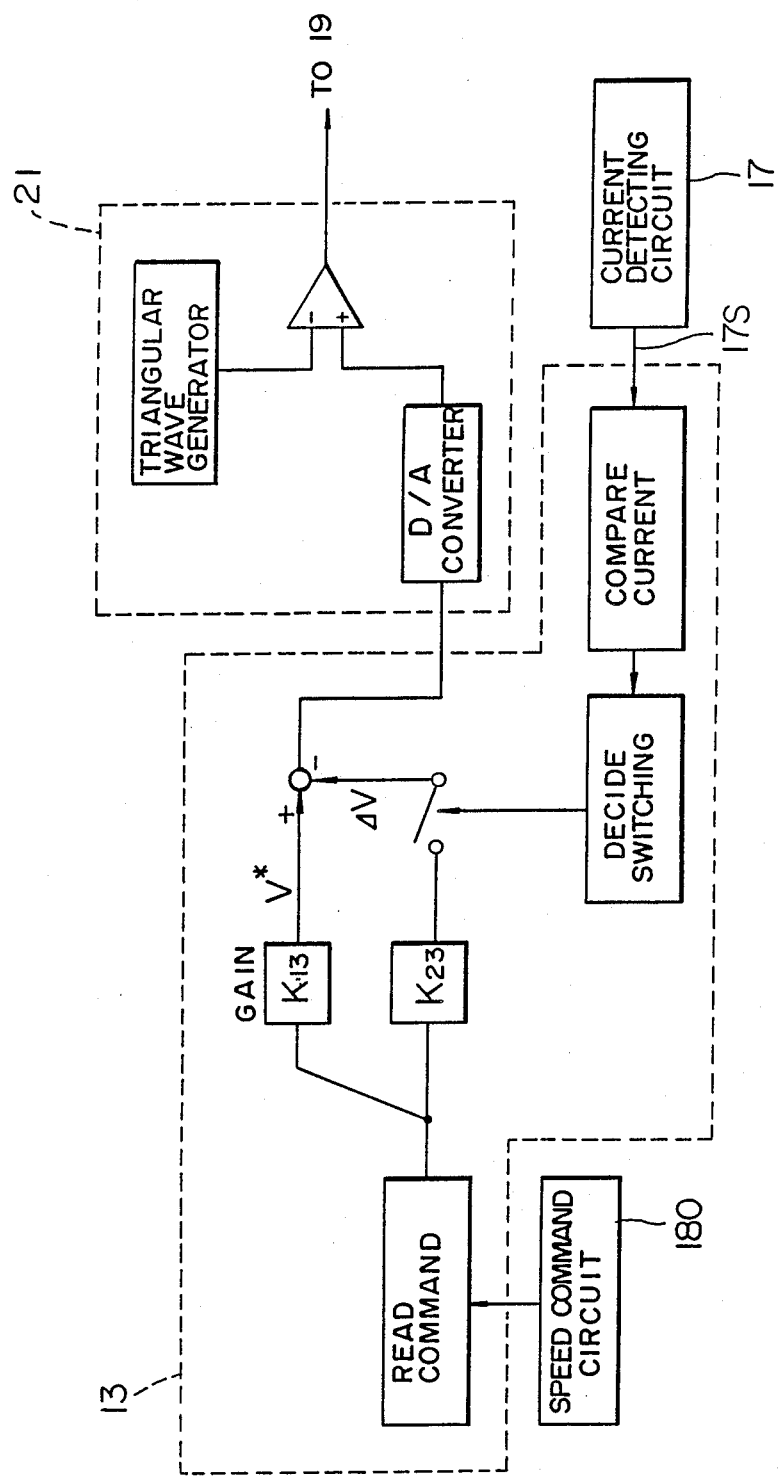

FIGS. 28 to 30 show another embodiment (7) of the invention. In this case, a speed control unit uses the speed control unit shown in FIG. 17.

FIG. 28 shows performance curves of a vacuum cleaner in which a brushless DC motor is used in a drive source. In the diagram, an axis of abscissa denotes an amount Q of wind which passes in the vacuum cleaner and an axis of ordinate indicates a suction power $P_{out}$ representative of the suction performance of the vacuum cleaner, a rotational speed N and a load current $I_D$ of the motor. The range from the maximum operating point to the minimum operating point is the operating range of the vacuum cleaner. On the other hand, since the wind amount Q decreases in dependence on the degree of choking state, the operating point for the chokes of the filter moves from the maximum operating point to the minimum operating point. Thus, as the degree of choking state increases, the suction power $P_{out}$ decreases in the ranges before and after the maximum suction power $P_{max}$ as a turning point and the performance as the vacuum cleaner lacks. Further, when the degree of sealing in the intake air passage rises because this passage is choked or a foreign matter is deposited therein, or the like, the rotational speed increases than it is needed. Such a situation cuases a problem in terms of the mechanical strength of the motor and the life of the bearing. To avoid such a problem, according to the invention, the load current of the motor is detected and the operating mode is decided on the basis of the level of the load current. In particular, when the load current decreased to a value which is equal to or lower than a predetermined value, the rotational speed is set to a constant value, thereby preventing the overrotation.

FIGS. 29A and 29B show changes in load current to the operating mode. The point $A_1$ at which the wind amount Q is large as shown in FIG. 3 corresponds to the case where the filter is not choked. The difference between the load current $I_D$ and the minimum current set value $I_{DS}$ shown by a broken line is large. On the other hand, a point $B_1$ at which the wind amount Q is small corresponds to the state in which the degree of sealing rises because the filter is choked or a foreign matter is inhaled in the intake air passage. The minimum value $I_{D2}$ of the current change is smaller than the minimum current set value $I_{DS}$ shown by a broken line. Thus, the choke of the intake passage or filter can be accurately decided by this value without using the sensor.

FIG. 30 is a schematic constitutional block diagram of a control circuit to drive a brushless DC motor of the invention. An open loop voltage control system has been shown as an example of a speed control system. In the diagram, when a command is input from the speed command circuit 180 to the microcomputer 13, the microcomputer 13 reads the command and outputs the speed command N*. The microcomputer 13 first selects a gain $K_{13}$ and supplies the voltage output data V* to the D/A converter in the voltage command circuit 21. An output of the D/A converter is compared with an output of the triangular wave generator by the comparator. An output of the comparator is input to the base driver 19. The voltage which is applied to the brushless DC motor 9 is determined. The motor is rotated at the rotational speed corresponding to the reference voltage.

In response to the detection signal 12S from the load current detecting circuit 12, the microcomputer 13 then compares the currents. A switching decision processing section determines whether the load current $I_D$ is smaller or larger than the minimum current set value $I_{DS}$. If the load current $I_D$ is smaller than the minimum current set value $I_{DS}$, it is determined that the filter is choked because such a foreign matter (handkerchief, nylon sheet, etc.) as to close the intake air passage has been inhaled. Thus, the voltage correction amount $\Delta V$ is subtracted from the voltage by the gain $K_{23}$, thereby correcting the voltage command (in other words, correcting the speed command) of the brushless DC motor. Therefore, there are effects such that the rotational speed of the motor is not increased to a value than it is needed and the overrotation can be prevented.

FIGS. 31 to 37 show another embodiment (8) of the invention. FIG. 38 shows another embodiment (9) of the invention. Both of these embodiments relate to an apparatus to operate a motor such that a vacuum cleaner can be also used by an AC power source of any of the low and high voltage systems.

Figure 31:
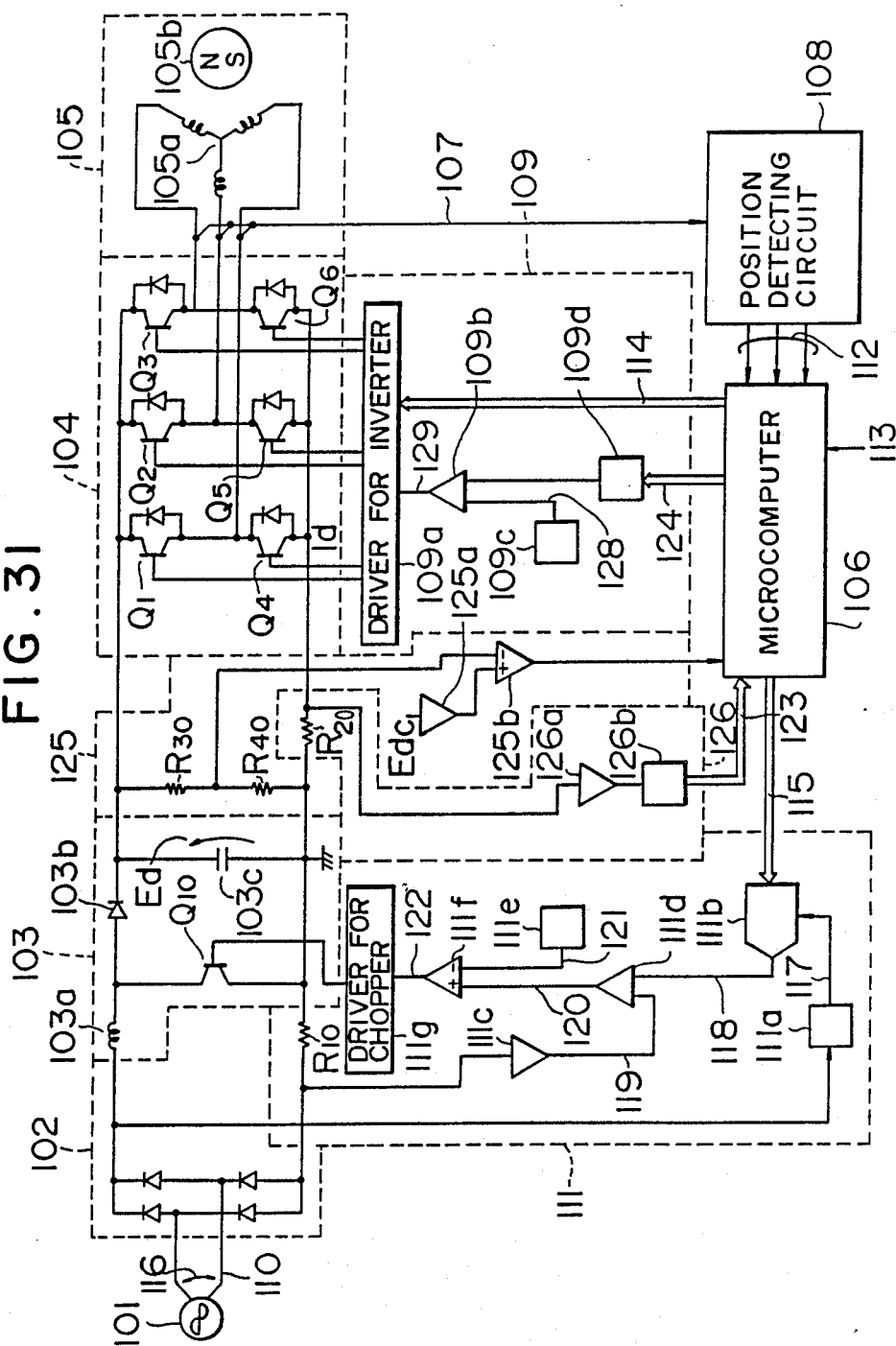

FIG. 31 shows a block diagram of a speed control unit of a brushless DC motor. An AC voltage 116 of an AC power source 101 is converted into a DC voltage $E_d$ through a rectifier 102 and a step-up chopper circuit 103 to improve the power factor. The DC electric power is supplied to an inverter 104. A winding 105a of a brushless DC motor 105 is driven by the inverter 104.

A control circuit to control the speed of the motor 105 comprises: a microcomputer 106; a position detecting circuit 108 to detect the position of the magnetic pole of a rotor 105b of the brushless DC motor 105 from a motor terminal voltage 107; an inverter control section 109 for transistors $Q_1$ to $Q_6$ constituting the inverter 104; a DC voltage control section 111 to control the step-up chopper circuit 103 while referring to the waveform and level of a power source current 110; a DC voltage comparing section 125 to decide whether the voltage system of the AC power source 101 is the low voltage system or the high voltage system; and a direct current detecting section 126 to detect a DC current $I_d$ flowing through the inverter 104.

Various kinds of programs necessary to drive the DC motor 105 are stored in the microcomputer 106. For example, the microcomputer 106 executes the following processes: the process to control the speed; the process to fetch a position detection signal 112 from the position detecting circuit 108, a speed command signal 113, a DC voltage comparison signal 130, and a detected direct current 123; and the process to output an inverter drive signal 114, a current command signal 115 to the DC voltage control section 111, and a voltage signal 124 to the inverter control section 109.

The chopper circuit 103 comprises a reactor 103a, a transistor $Q_7$, a diode 103b, and a smoothing capacitor 103c. A drive signal to the transistor $Q_7$ is made by the DC voltage control section 111. By changing the on time and off time of the transistor $Q_7$, the level of the power source current 110 is changed.

Figure 32:
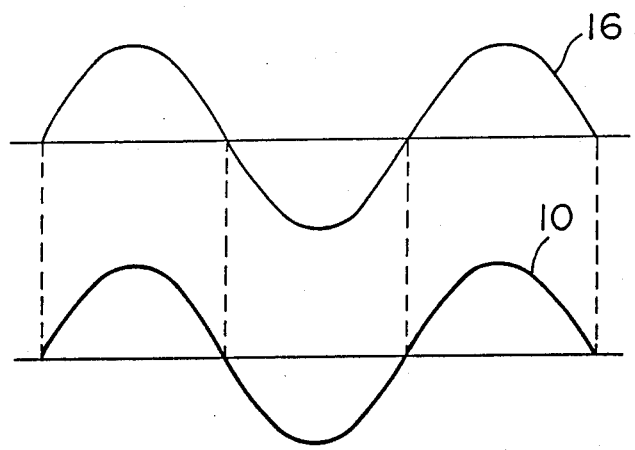

FIG. 32 shows the relation between the power source voltage 116 and the power source current 110. The waveform of the power source current 110 is set to the sine wave of the same phase as that of the power source voltage 116 by the chopper circuit 103 which is controlled by the DC voltage control section 111 and at the same time, the effective value as the magnitude of the sine wave is controlled in accordance with the current command signal 115 which is output from the microcomputer 106, thereby setting the power factor of the power source to about 1.0.

The power source current control section 111 comprises: a power source voltage detecting circuit 111a to make a voltage signal 117 having the full-wave rectified waveform synchronized with the power source voltage 116 from an output voltage of the rectifier 102; a D/A converter 111b with a multiplication to make a sync current command signal 118 as an analog signal by multiplying the voltage signal 117 with the current command signal 115 as a digital signal; a power source current amplifier 111c to convert the full-wave rectified waveform of the power source current 110 into the voltage by a resistor $R_{10}$ and to detect and amplify; a current control amplifier 111d to compare a detection power source current signal 119 as an output of the power source current amplifier 111c with the sync current command signal 118, thereby setting the difference voltage to 0; a comparator 111f to compare a difference signal 120 as an output of the current control amplifier 111d with a triangular wave signal 121 as an output of a triangular wave oscillator 111e, thereby making a chopper signal 122 for the transistor $Q_7$; and a driver 111g for the chopper for the transistor $Q_7$.

The inverter control section 109 comprises: a D/A converter 109d to convert the voltage control signal 124 as a digital signal which is output from the microcomputer 106 into the analog signal; a comparator 109b to compare a voltage signal 127 as an output of the D/A converter 109d with a triangular wave signal 128 as an output of a triangular wave oscillator 109c, thereby making a chopper signal 129 for the inverter 104; and a driver 109a for the inverter 104.

The direct current detecting section 126 comprises: a direct current amplifier 126a to convert a direct current $I_d$ into a voltage by a resistor $R_{20}$ and to detect and amplify; and an A/D converter 126b to convert an output of the direct current amplifier 126a into a digital signal.

The DC voltage comparing section 125 comprises: a set voltage amplifier 125a to amplify a DC set voltage $E_{dc}$; and a comparator 125b to compare an output of the set voltage amplifier 125a with the DC voltage $E_d$ detected by resistors $R_{30}$ and $R_{40}$.

With the foregoing constitution, the reasons why the different control methods are used for the case where the AC power souce 101 is of the low voltage system and for the case where it is of the high voltage system and its switching method will now be explained hereinbelow.

A brushless DC motor 105 controls the speed by changing an output voltage of the inverter 104. As a method of changing the output voltage, there are a method whereby the DC voltage $E_d$ is changed by the step-up chopper circuit 103 to improve the power factor and a method whereby the voltage which is applied to the motor 105 is changed by the PWM control by the inverter 104. According to the former method, since the chopper circuit 103 is used, when the DC voltage $E_d$ is set to be lower than the peak value of the power source voltage 116 of the AC power source 101, the chopper circuit 103 is turned off and does not operate at the position near the peak value of the power source voltage 116, so that the power source current 110 cannot be controlled to a sine wave. To control the speed in such a range, it is necessary to perform the PWM control by the inverter 104 on the basis of the latter method.

On the other hand, when the same control method is used for the low voltage system and high voltage system, the voltage which is applied to the motor 105 changes by twice/half of the applied voltage. To obtain the same characteristic, two kinds of motors 105 which are applied with different voltages are necessary. Therefore, different control methods are used for the low voltage system and high voltage system by a method which will be explained hereinbelow.

Figure 33:
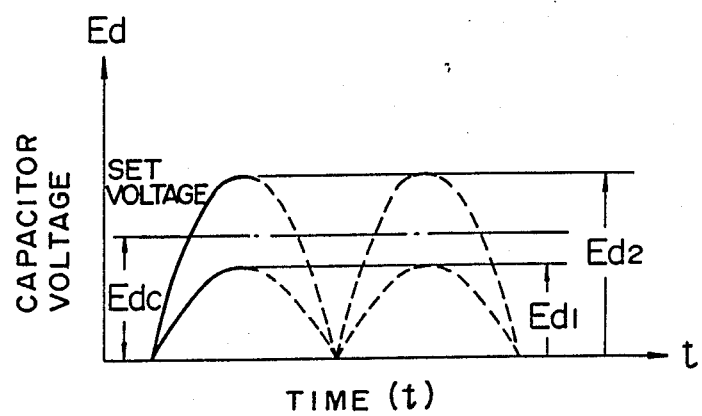

FIG. 33 shows the capacitor charging voltage $E_d$ before the motor 105 is activated. The capacitor voltage $E_d$ is held at $E_{d1}$ in the case of the low voltage system and at $E_{d2}$ in the case of the high voltage system. When a set voltage $E_{dc}$ in the DC voltage comparing section 125 is set to a value which is higher than $E_{d1}$ and lower than $E_{d2}$, the output signal 130 of the comparator 125b changes to the high level for the low voltage system and to the low level for the high voltage system.

Figure 34:
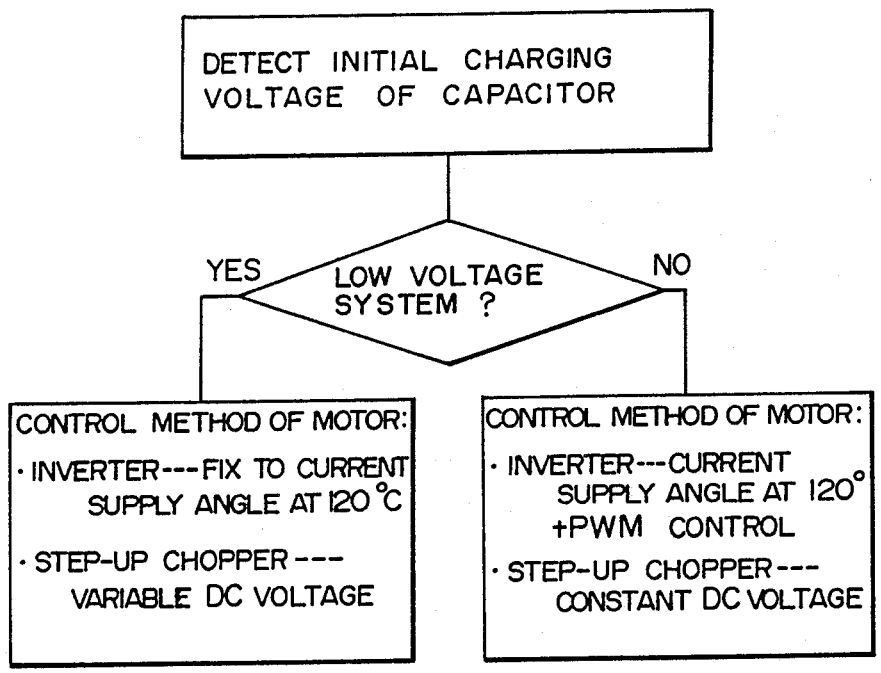

FIG. 34 shows the content of processes which are executed by the microcomputer 106. By fetching the output signal 130 of the DC voltage comparing section 125, it is decided whether the initial charging voltage $E_d$ of the capacitor 103c is of the low voltage system or of the high voltage system. When it is of the low voltage system, the inverter 104 is controlled by fixing the current supply angle to 120° and the DC voltage $E_d$ which is output from the chopper circuit 103 is made variable, thereby controlling the speed of the motor 105. In the case of the high voltage system, the DC voltage $E_d$ which is output from the chopper circuit 103 is set to a fixed value and the inverter 104 is controlled by setting the current supply angle to 120° and by performing the PWM, thereby controlling the speed of the motor 105.

Figure 35:
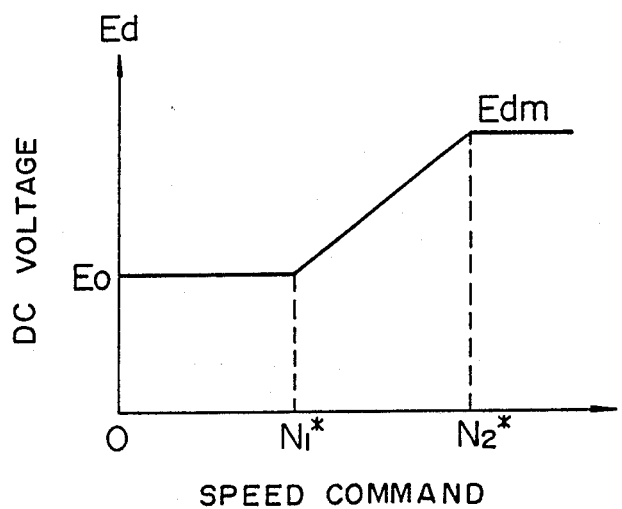
Figure 36A:
FIGS. 36A and 36B are diagrams showing waveforms of voltages which are applied to the motor when its rotational speed is controlled by a step-up chopper circuit to improve the power factor.
Figure 36B:
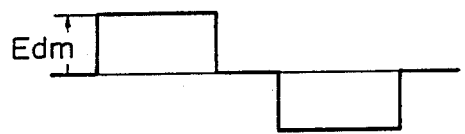

A practical example will now be explained. In the case of the low voltage system, as shown in FIG. 35, the DC voltage $E_d$ is changed to $E_0$ to $E_{dm}$ (the maximum value) by the chopper circuit 103 in accordance with speed command signals $N_1^*$ to $N_2^*$. FIGS. 36A and 36B show line voltages of one phase of the motor 105. Since the inverter 104 is controlled by fixing the current supply to 120°, the applied voltage of the motor 105 varies depending on the chopper circuit 103. The speed of the motor 105 is controlled by the chopper circuit 103.

Figure 37A:
FIGS. 37A and 37B are diagrams showing waveforms of voltages which are applied to the motor when its rotational speed is controlled by an inverter.
Figure 37B:
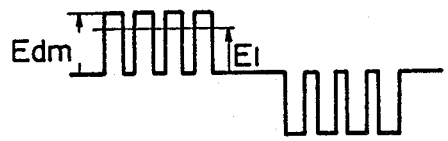
Figure 38:
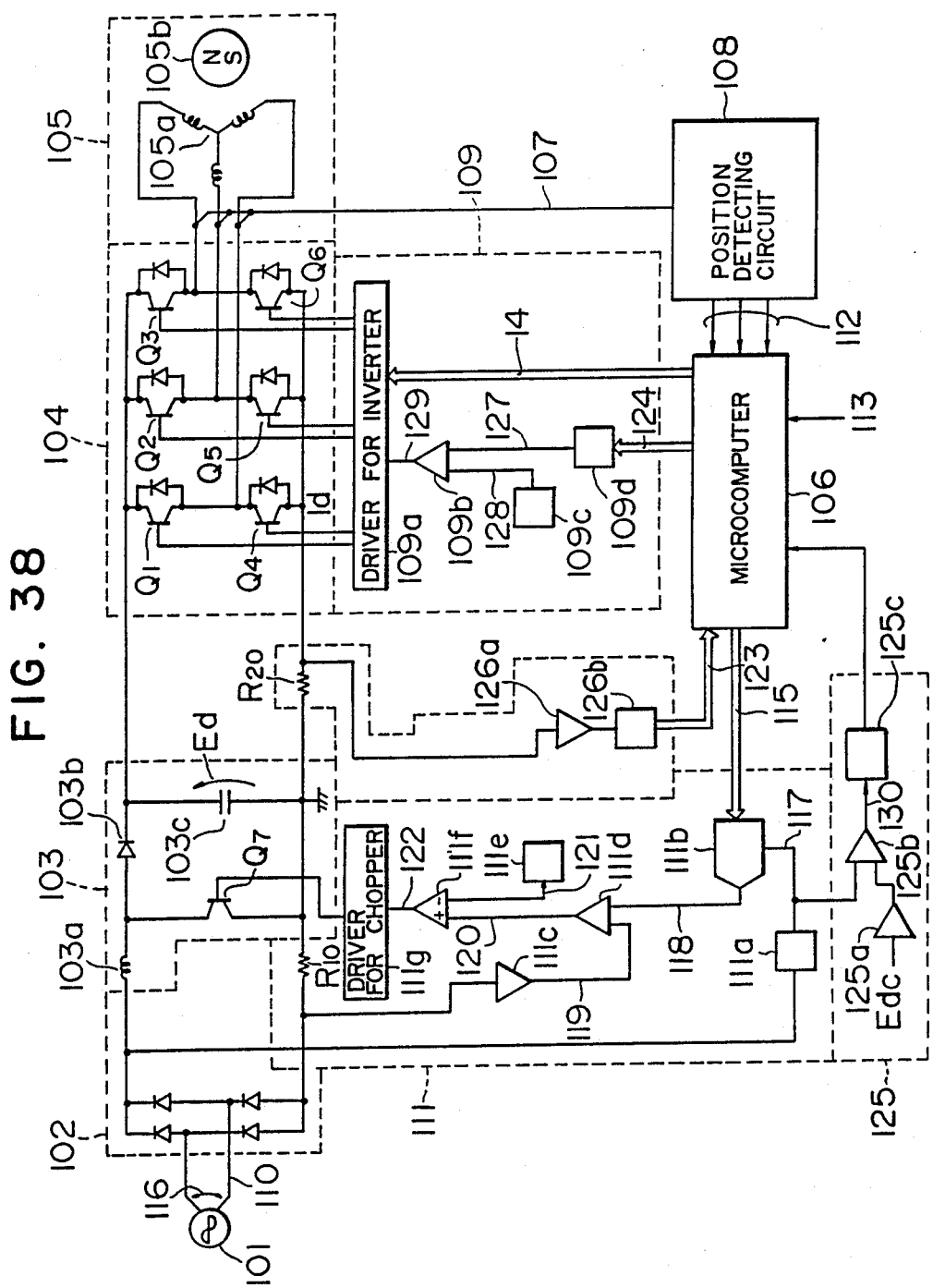
FIG. 38 is a circuit constitutional block diagram showing another embodiment (9) of the invention.

In the case of the high voltage system, as shown in FIGS. 37A and 37B, the chopper circuit 103 is controlled such that the DC voltage $E_d$ is set to a constant value of $E_{dm}$ (the maximum voltage for the low voltage system) and the inverter 104 is controlled by fixing the current supply angle to 120° and by performing the PWM. Therefore, the average voltage $E_1$ is changed by the PWM control and the speed of the motor 105 is controlled by the inverter 104.

Thus, the voltage which is applied to the motor 105 is set to the same voltage in both cases where the AC power source 101 is of the low voltage system and where it is of the high voltage system. One kind of brushless DC motor 105 can be used irrespective of the power source voltage 116.

An operating apparatus of FIG. 38 differs from that of FIG. 31 with respect to a point that the decision regarding whether the AC power source voltage 116 is of the low voltage system or of the high voltage system is performed on the basis of the output voltage of the rectifier 102. Since the output signal 130 of the DC voltage comparing section 125 has a pulse waveform, a latch circuit 125c is provided and an output of the latch circuit 125c is input to the microcomputer 106. With this constitution, by fetching this output signal, it is always possible to determine whether the power source voltage $E_d$ is of the low voltage system or of the high voltage system.

We claim:
1. An apparatus for operating a vacuum cleaner having a filter to collect dusts and a fan motor to give a suction force to a cleaner, comprising:
   a circuit to apply an electric power to said fan motor;
   a circuit to detect an actual rotational speed of the fan motor;
   a base driver to control the electric power which is applied to the fan motor;
   a microcomputer with a ROM having stored therein a plurality of function tables corresponding to control patterns for a speed command for said fan motor for respective ones of a plurality of different cleaning surfaces, said control pattern being corrected in accordance with a choking state of a vacuum cleaner filter;
   means for inputting to the microcomputer the value of the rotational speed derived by said circuit to detect the rotational speed of the fan motor; and
   wherein said microcomputer further includes means for selecting one of the function tables on the basis of the value of the actually detected rotational speed and a fluctuation in said rotational speed, comparing the value of the input rotational speed with the control pattern of the selected function table and giving a new command to said base driver on the basis of said comparison value.

2. An apparatus according to claim 1, wherein said speed detecting circuit is a magnetic pole position detecting circuit to detect the position of the magnetic pole of said motor.

* * * * *

UNITED STATES PATENT AND TRADEMARK OFFICE
CERTIFICATE OF CORRECTION

PATENT NO. : 4,983,895
DATED : Jan. 8, 1991
INVENTOR(S) : KOHARAGI, et al

It is certified that error appears in the above-identified patent and that said Letters Patent is hereby corrected as shown below:

On the title page, please insert:

-- [30]  Foreign Application Priority Data

|  | Oct. 8, 1986 | [JP] | Japan | ....... | 61-237938 |
|  | Oct. 8, 1986 | [JP] | Japan | ....... | 61-237942 |
|  | Oct. 8, 1986 | [JP] | Japan | ....... | 61-237943 |
|  | Mar. 6, 1987 | [JP] | Japan | ....... | 62-50073 |
|  | Mar. 23, 1987 | [JP] | Japan | ....... | 62-65608 |
|  | Mar. 25, 1987 | [JP] | Japan | ....... | 62-69072 |
|  | Apr. 3, 1987 | [JP] | Japan | ....... | 62-80950 |
|  | Apr. 3, 1987 | [JP] | Japan | ....... | 62-80951 -- |

Signed and Sealed this

Nineteenth Day of January, 1993

*Attest:*

DOUGLAS B. COMER

*Attesting Officer*  *Acting Commissioner of Patents and Trademarks*